United States Patent
Kim

(10) Patent No.: US 12,267,304 B2
(45) Date of Patent: Apr. 1, 2025

(54) SYSTEM FOR AUTHENTICATING AND CONTROLLING NETWORK ACCESS OF TERMINAL, AND METHOD THEREFOR

(71) Applicant: PRIBIT Technology, Inc., Seoul (KR)

(72) Inventor: Young Rang Kim, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 18 days.

(21) Appl. No.: 17/656,172

(22) PCT Filed: Sep. 24, 2020

(86) PCT No.: PCT/KR2020/012929
§ 371 (c)(1),
(2) Date: Mar. 23, 2022

(87) PCT Pub. No.: WO2021/060859
PCT Pub. Date: Apr. 1, 2021

(65) Prior Publication Data
US 2022/0247721 A1 Aug. 4, 2022

Related U.S. Application Data

(63) Continuation-in-part of application No. 16/580,974, filed on Sep. 24, 2019, now Pat. No. 11,381,557, and
(Continued)

(30) Foreign Application Priority Data

Aug. 10, 2020 (KR) .................. 10-2020-0100062

(51) Int. Cl.
*H04L 9/40* (2022.01)
*H04L 47/20* (2022.01)
*H04L 47/24* (2022.01)

(52) U.S. Cl.
CPC ............ *H04L 63/029* (2013.01); *H04L 47/20* (2013.01); *H04L 47/24* (2013.01);
(Continued)

(58) Field of Classification Search
CPC ............... H04L 63/029; H04L 63/0236; H04L 63/0263; H04L 63/0272; H04L 63/0428; H04L 63/08; H04L 63/126
(Continued)

(56) References Cited

U.S. PATENT DOCUMENTS 5,995,623 A 11/1999 Kawano et al.
6,076,168 A 6/2000 Fiveash et al.
(Continued)

FOREIGN PATENT DOCUMENTS

CN 104284385 A 1/2015
CN 105471748 A 4/2016
(Continued)

OTHER PUBLICATIONS

Hassan, Suhaidi, et al.; Border Gateway Protocol based Path Vector mechanism for inter-domain routing in Software Defined Network environment; IEEE Conference on Open Systems (ICOS); Langkawi, Malaysia; Oct. 10, 2016; 5 Pages.
(Continued)

*Primary Examiner* — Dant B Shaifer Harriman
(74) *Attorney, Agent, or Firm* — Seed IP Law Group LLP

(57) ABSTRACT

A terminal including a communication circuit, a processor, and a memory storing a target application and an access control application. The memory may store instructions which, when executed by the processor, enable the terminal to detect a network access event for a destination network of the target application, via the access control application, identify whether identification information of the target application and data flow information corresponding to the
(Continued)

destination network are present via the access control application, identify whether authentication of data flow indicated by the data flow information is valid via the access control information, and drop a data packet of the target application when the data flow information is not present or the authentication of data flow is not valid or transmit the data packet of the target application when the data flow information is present and the authentication of data flow is valid.

9 Claims, 20 Drawing Sheets

Related U.S. Application Data a continuation-in-part of application No. 16/580,866, filed on Sep. 24, 2019, now Pat. No. 11,190,494.

(52) U.S. Cl.
CPC ...... *H04L 63/0236* (2013.01); *H04L 63/0263* (2013.01); *H04L 63/0272* (2013.01); *H04L 63/0428* (2013.01); *H04L 63/08* (2013.01); *H04L 63/126* (2013.01)

(58) Field of Classification Search
USPC ......................................................... 726/11
See application file for complete search history.

(56) References Cited

U.S. PATENT DOCUMENTS

| | | | |
|---|---|---|---|
| 6,738,909 B1 | 5/2004 | Cheng et al. |
| 6,963,982 B1 | 11/2005 | Brustoloni et al. |
| 7,139,276 B1 | 11/2006 | Sitaraman et al. |
| 7,215,667 B1 | 5/2007 | Davis |
| 7,302,496 B1 | 11/2007 | Metzger |
| 7,318,234 B1 | 1/2008 | Dharmarajan |
| 7,346,770 B2 | 3/2008 | Swander et al. |
| 7,606,902 B2 | 10/2009 | Rao et al. |
| 7,760,636 B1 | 7/2010 | Cheriton |
| 7,920,701 B1 | 4/2011 | Cox et al. |
| 7,978,714 B2 | 7/2011 | Rao et al. |
| 8,000,327 B1 | 8/2011 | Minei et al. |
| 8,019,868 B2 | 9/2011 | Rao et al. |
| 8,024,488 B2* | 9/2011 | Salowey ................. G06F 21/44 |
| | | | 710/10 |
| 8,289,968 B1 | 10/2012 | Zhuang |
| 8,291,119 B2 | 10/2012 | Rao et al. |
| 8,363,650 B2 | 1/2013 | Rao et al. |
| 8,385,199 B1 | 2/2013 | Coward et al. |
| 8,612,612 B1 | 12/2013 | Dukes et al. |
| 8,843,998 B2 | 9/2014 | Fu et al. |
| 8,892,778 B2 | 11/2014 | Rao et al. |
| 8,897,299 B2 | 11/2014 | Rao et al. |
| 8,923,853 B1 | 12/2014 | Shaw et al. |
| 9,088,564 B1 | 7/2015 | Hobson et al. |
| 9,106,538 B1 | 8/2015 | Asnis |
| 9,143,481 B2* | 9/2015 | Wood ................... H04L 12/4641 |
| 9,143,942 B2 | 9/2015 | Agarwal et al. |
| 9,148,408 B1* | 9/2015 | Glazemakers .......... H04L 63/20 |
| 9,240,938 B2 | 1/2016 | Dimond et al. |
| 9,252,972 B1 | 2/2016 | Dukes et al. |
| 9,356,866 B1 | 5/2016 | Sivaramakrishnan et al. |
| 9,402,002 B1 | 7/2016 | Hao et al. |
| 9,578,052 B2 | 2/2017 | Cp et al. |
| 9,715,597 B2 | 7/2017 | Smith et al. |
| 9,860,208 B1 | 1/2018 | Ettema et al. |
| 9,912,673 B2* | 3/2018 | Evenden .............. H04L 63/0272 |
| 9,984,230 B2 | 5/2018 | Pikhur et al. |
| 10,033,766 B2* | 7/2018 | Gupta .................... H04L 63/20 |
| 10,129,207 B1 | 11/2018 | Wan et al. |
| 10,162,767 B2 | 12/2018 | Spurlock et al. |
| 10,176,344 B2 | 1/2019 | Smith et al. |
| 10,205,743 B2 | 2/2019 | Cp et al. |
| 10,243,833 B2 | 3/2019 | Tang et al. |
| 10,326,672 B2 | 6/2019 | Scheib et al. |
| 10,339,303 B2 | 7/2019 | Mehta et al. |
| 10,402,577 B2 | 9/2019 | Knapp et al. |
| 10,484,334 B1 | 11/2019 | Lee et al. |
| 10,659,434 B1 | 5/2020 | Kim et al. |
| 10,659,462 B1 | 5/2020 | Kim et al. |
| 10,764,249 B1 | 9/2020 | Kommula et al. |
| 10,785,111 B2 | 9/2020 | Hill et al. |
| 10,812,576 B1 | 10/2020 | Yuan et al. |
| 10,903,990 B1 | 1/2021 | Ladd et al. |
| 11,271,777 B2 | 3/2022 | Kim et al. |
| 11,379,611 B1 | 7/2022 | Horesh et al. |
| 2001/0039576 A1 | 11/2001 | Kanada |
| 2002/0010800 A1* | 1/2002 | Riley ................... H04L 63/0218 |
| | | | 726/13 |
| 2002/0049899 A1* | 4/2002 | Kenworthy ........... G06F 16/951 |
| | | | 713/1 |
| 2002/0161905 A1 | 10/2002 | Haverinen et al. |
| 2002/0163920 A1 | 11/2002 | Walker et al. |
| 2003/0041172 A1 | 2/2003 | Calvignac et al. |
| 2003/0055978 A1 | 3/2003 | Collins |
| 2003/0131263 A1 | 7/2003 | Keane et al. |
| 2003/0188192 A1 | 10/2003 | Tang et al. |
| 2003/0212900 A1 | 11/2003 | Liu et al. |
| 2004/0081150 A1 | 4/2004 | Chiang et al. |
| 2004/0088385 A1 | 5/2004 | Blanchet et al. |
| 2004/0136534 A1 | 7/2004 | Stiscia et al. |
| 2004/0139339 A1 | 7/2004 | Yeh et al. |
| 2004/0190449 A1 | 9/2004 | Mannal et al. |
| 2004/0215819 A1 | 10/2004 | Tsuruoka et al. |
| 2005/0060328 A1 | 3/2005 | Suhonen et al. |
| 2005/0111399 A1* | 5/2005 | Sapienza ............... H04L 69/168 |
| | | | 370/328 |
| 2005/0273609 A1 | 12/2005 | Eronen |
| 2005/0273853 A1 | 12/2005 | Oba et al. |
| 2005/0283604 A1 | 12/2005 | Deshpande et al. |
| 2006/0018291 A1 | 1/2006 | Patel et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0037071 A1 | 2/2006 | Rao et al. |
| 2006/0153067 A1 | 7/2006 | Vasseur et al. |
| 2006/0159029 A1* | 7/2006 | Samuels ............. H04L 41/0809 |
| | | | 370/252 |
| 2006/0182111 A1 | 8/2006 | Wahl |
| 2006/0242405 A1 | 10/2006 | Gupta et al. |
| 2006/0262808 A1 | 11/2006 | Lin et al. |
| 2007/0088959 A1 | 4/2007 | Cox et al. |
| 2007/0147421 A1 | 6/2007 | Kim |
| 2007/0186100 A1 | 8/2007 | Wakameda |
| 2007/0189486 A1 | 8/2007 | Ise |
| 2008/0080509 A1 | 4/2008 | Khanna et al. |
| 2008/0130515 A1 | 6/2008 | Vasseur |
| 2008/0148379 A1* | 6/2008 | Xu ....................... H04L 65/1069 |
| | | | 726/11 |
| 2008/0162924 A1 | 7/2008 | Chinitz et al. |
| 2008/0313240 A1 | 12/2008 | Freking et al. |
| 2009/0077618 A1 | 3/2009 | Pearce et al. |
| 2009/0245204 A1 | 10/2009 | Voyer et al. |
| 2009/0287955 A1 | 11/2009 | Matsumoto et al. |
| 2010/0002693 A1 | 1/2010 | Rao et al. |
| 2010/0005311 A1 | 1/2010 | Okamoto |
| 2010/0011056 A1 | 1/2010 | Bryson et al. |
| 2010/0024026 A1 | 1/2010 | Ylonen et al. |
| 2010/0061253 A1 | 3/2010 | Kaminsky et al. |
| 2010/0199325 A1 | 8/2010 | Raleigh |
| 2010/0278338 A1 | 11/2010 | Chang et al. |
| 2010/0306816 A1 | 12/2010 | Mcgrew et al. |
| 2011/0032868 A1 | 2/2011 | Huang et al. |
| 2011/0158237 A1 | 6/2011 | Mcdysan et al. |
| 2011/0161416 A1 | 6/2011 | Mcdysan et al. |
| 2011/0261723 A1 | 10/2011 | Yamato et al. |
| 2011/0271093 A1 | 11/2011 | McKenna |
| 2012/0014314 A1 | 1/2012 | Chen et al. |
| 2012/0084368 A1 | 4/2012 | Go et al. |
| 2012/0303835 A1 | 11/2012 | Kempf et al. |

(56) References Cited

U.S. PATENT DOCUMENTS

| | | |
|---|---|---|
| 2012/0304276 A1 | 11/2012 | Legacy et al. |
| 2013/0054761 A1 | 2/2013 | Kempf et al. |
| 2013/0083799 A1 | 4/2013 | Xie et al. |
| 2013/0128892 A1 | 5/2013 | Rao et al. |
| 2013/0163470 A1* | 6/2013 | Chidambaram ...... H04L 69/161 370/467 |
| 2013/0166720 A1 | 6/2013 | Takashima et al. |
| 2013/0232263 A1 | 9/2013 | Kelly et al. |
| 2013/0318345 A1 | 11/2013 | Hengeveld |
| 2013/0322255 A1 | 12/2013 | Dillon |
| 2013/0336159 A1 | 12/2013 | Previdi et al. |
| 2014/0059356 A1 | 2/2014 | Nesnow |
| 2014/0101716 A1 | 4/2014 | Touboul |
| 2014/0105382 A1 | 4/2014 | Liu |
| 2014/0108668 A1 | 4/2014 | Zhang et al. |
| 2014/0122716 A1* | 5/2014 | Santhiveeran ...... H04L 63/0272 709/225 |
| 2014/0156720 A1 | 6/2014 | Janakiraman et al. |
| 2014/0211799 A1 | 7/2014 | Yu et al. |
| 2014/0237137 A1 | 8/2014 | Ervin et al. |
| 2014/0237539 A1 | 8/2014 | Wing et al. |
| 2014/0241247 A1 | 8/2014 | Kempf et al. |
| 2014/0301396 A1 | 10/2014 | Hong et al. |
| 2014/0301397 A1 | 10/2014 | Zhou |
| 2014/0334488 A1 | 11/2014 | Guichard et al. |
| 2014/0359159 A1 | 12/2014 | Diaz-Cuellar |
| 2015/0074756 A1 | 3/2015 | Deng et al. |
| 2015/0085664 A1 | 3/2015 | Sachdev et al. |
| 2015/0109967 A1 | 4/2015 | Hogan et al. |
| 2015/0121449 A1 | 4/2015 | Cp et al. |
| 2015/0188949 A1 | 7/2015 | Mahaffey et al. |
| 2015/0261972 A1 | 9/2015 | Lee |
| 2015/0281060 A1 | 10/2015 | Xiao |
| 2015/0281131 A1 | 10/2015 | Bhat et al. |
| 2015/0281173 A1 | 10/2015 | Quinn et al. |
| 2015/0341259 A1 | 11/2015 | Li et al. |
| 2015/0347768 A1 | 12/2015 | Martin et al. |
| 2015/0371055 A1 | 12/2015 | Park et al. |
| 2016/0043866 A1 | 2/2016 | Nixon et al. |
| 2016/0092700 A1 | 3/2016 | Smith et al. |
| 2016/0094661 A1 | 3/2016 | Jain et al. |
| 2016/0099917 A1* | 4/2016 | Glazemakers ...... H04L 63/0272 726/12 |
| 2016/0105471 A1 | 4/2016 | Nunes et al. |
| 2016/0142293 A1 | 5/2016 | Hu et al. |
| 2016/0180092 A1 | 6/2016 | Aktas |
| 2016/0182550 A1 | 6/2016 | Spurlock |
| 2016/0191380 A1 | 6/2016 | De et al. |
| 2016/0197830 A1 | 7/2016 | Ulevitch et al. |
| 2016/0226779 A1 | 8/2016 | Kikuchi |
| 2016/0261557 A1 | 9/2016 | Herrero et al. |
| 2016/0283728 A1 | 9/2016 | Antonopoulos et al. |
| 2016/0285735 A1 | 9/2016 | Chen et al. |
| 2016/0285846 A1* | 9/2016 | Abe ............... H04L 63/0236 |
| 2016/0292430 A1 | 10/2016 | Antonopoulos et al. |
| 2016/0294710 A1 | 10/2016 | Sreeramoju |
| 2016/0315853 A1 | 10/2016 | Liste et al. |
| 2016/0352685 A1 | 12/2016 | Park |
| 2016/0359673 A1 | 12/2016 | Gupta et al. |
| 2016/0360352 A1 | 12/2016 | Khan et al. |
| 2016/0371484 A1 | 12/2016 | Mehta et al. |
| 2016/0373304 A1 | 12/2016 | Sharma et al. |
| 2016/0378685 A1 | 12/2016 | Spurlock et al. |
| 2016/0378975 A1 | 12/2016 | Pikhur et al. |
| 2016/0379003 A1 | 12/2016 | Kapoor et al. |
| 2016/0381051 A1 | 12/2016 | Edwards et al. |
| 2017/0012956 A1 | 1/2017 | Lee et al. |
| 2017/0026349 A1 | 1/2017 | Smith et al. |
| 2017/0034052 A1 | 2/2017 | Chanda et al. |
| 2017/0041229 A1 | 2/2017 | Zheng |
| 2017/0063782 A1 | 3/2017 | Jain et al. |
| 2017/0063927 A1 | 3/2017 | Schultz et al. |
| 2017/0078184 A1 | 3/2017 | Tang et al. |
| 2017/0099160 A1 | 4/2017 | Mithyantha et al. |
| 2017/0104851 A1 | 4/2017 | Arangasamy et al. |
| 2017/0118228 A1 | 4/2017 | Cp et al. |
| 2017/0171055 A1 | 6/2017 | Wang et al. |
| 2017/0223063 A1 | 8/2017 | Herrero |
| 2017/0237552 A1 | 8/2017 | Karame |
| 2017/0237760 A1 | 8/2017 | Holeman et al. |
| 2017/0264695 A1 | 9/2017 | Markovitz et al. |
| 2017/0317954 A1 | 11/2017 | Masurekar et al. |
| 2017/0339631 A1 | 11/2017 | Pugaczewski et al. |
| 2017/0346731 A1 | 11/2017 | Pukhraj Jain et al. |
| 2017/0353378 A1 | 12/2017 | Chen |
| 2017/0359247 A1 | 12/2017 | Dixon |
| 2017/0374025 A1 | 12/2017 | Pan |
| 2018/0013786 A1 | 1/2018 | Knopf |
| 2018/0018476 A1 | 1/2018 | Smith et al. |
| 2018/0026949 A1* | 1/2018 | Kimn ............... H04W 12/069 713/156 |
| 2018/0063077 A1 | 3/2018 | Tumuluru |
| 2018/0123827 A1 | 5/2018 | Josyula |
| 2018/0124183 A1 | 5/2018 | Kozat et al. |
| 2018/0139176 A1 | 5/2018 | Sato |
| 2018/0262487 A1 | 9/2018 | Zaifman et al. |
| 2018/0309786 A1 | 10/2018 | Apelewicz et al. |
| 2018/0324761 A1 | 11/2018 | Velev et al. |
| 2018/0337788 A1 | 11/2018 | Gajek et al. |
| 2018/0359231 A1 | 12/2018 | Vemulapalli et al. |
| 2019/0005148 A1 | 1/2019 | Lam et al. |
| 2019/0014152 A1 | 1/2019 | Verma et al. |
| 2019/0021122 A1 | 1/2019 | Kawasaki et al. |
| 2019/0036708 A1 | 1/2019 | Fregly et al. |
| 2019/0097805 A1 | 3/2019 | Shin et al. |
| 2019/0109822 A1 | 4/2019 | Clark et al. |
| 2019/0109848 A1 | 4/2019 | Clark et al. |
| 2019/0155752 A1 | 5/2019 | Spurlock et al. |
| 2019/0173736 A1 | 6/2019 | Ponnuswamy et al. |
| 2019/0173850 A1 | 6/2019 | Jain et al. |
| 2019/0173891 A1 | 6/2019 | Cp et al. |
| 2019/0190746 A1 | 6/2019 | Lee et al. |
| 2019/0205045 A1* | 7/2019 | Hugot ............... G06F 21/604 |
| 2019/0207747 A1 | 7/2019 | Durvasula et al. |
| 2019/0222559 A1 | 7/2019 | Wang et al. |
| 2019/0238592 A1 | 8/2019 | Qureshi et al. |
| 2019/0246148 A1 | 8/2019 | Oh et al. |
| 2019/0278908 A1 | 9/2019 | Mehta et al. |
| 2019/0306018 A1 | 10/2019 | Steverson et al. |
| 2019/0306035 A1 | 10/2019 | Scheib et al. |
| 2019/0312775 A1 | 10/2019 | Patil et al. |
| 2019/0313295 A1 | 10/2019 | Xu et al. |
| 2019/0335022 A1 | 10/2019 | Pasam et al. |
| 2019/0349317 A1 | 11/2019 | Lu |
| 2019/0349369 A1 | 11/2019 | Bengtson et al. |
| 2019/0372948 A1 | 12/2019 | Varghese et al. |
| 2019/0379532 A1 | 12/2019 | Si et al. |
| 2019/0394017 A1* | 12/2019 | Hartwig ............ H04L 63/0428 |
| 2020/0036735 A1 | 1/2020 | Canard et al. |
| 2020/0052928 A1 | 2/2020 | Lee et al. |
| 2020/0068049 A1 | 2/2020 | Ngo et al. |
| 2020/0076733 A1 | 3/2020 | Venkataraman |
| 2020/0076740 A1 | 3/2020 | Kim et al. |
| 2020/0076927 A1 | 3/2020 | Barthur et al. |
| 2020/0112540 A1 | 4/2020 | Venkataraman |
| 2020/0119981 A1 | 4/2020 | Guthrie et al. |
| 2020/0153604 A1 | 5/2020 | Sun et al. |
| 2020/0162919 A1* | 5/2020 | Velev ............... H04W 60/00 |
| 2020/0177550 A1 | 6/2020 | Valluri et al. |
| 2020/0177606 A1 | 6/2020 | Valluri et al. |
| 2020/0177658 A1 | 6/2020 | Barthur et al. |
| 2020/0184112 A1 | 6/2020 | Wallach |
| 2020/0213154 A1 | 7/2020 | Han et al. |
| 2020/0213280 A1 | 7/2020 | Guim Bernat et al. |
| 2020/0228503 A1 | 7/2020 | Zhang et al. |
| 2020/0244625 A1 | 7/2020 | Tummalapenta et al. |
| 2020/0252898 A1 | 8/2020 | Bild et al. |
| 2020/0274851 A1 | 8/2020 | Qiao et al. |
| 2020/0287749 A1 | 9/2020 | Glazemakers et al. |
| 2020/0314179 A1 | 10/2020 | He et al. |
| 2020/0351254 A1 | 11/2020 | Xiong et al. |
| 2020/0389393 A1 | 12/2020 | Bosch et al. |
| 2021/0218777 A1 | 7/2021 | Chander et al. |
| 2021/0243163 A1 | 8/2021 | Miriyala et al. |

(56) References Cited

U.S. PATENT DOCUMENTS

| | | |
|---|---|---|
| 2021/0266156 A1 | 8/2021 | Zee et al. |
| 2021/0266161 A1 | 8/2021 | Zee et al. |
| 2021/0328830 A1 | 10/2021 | Kim et al. |
| 2021/0360083 A1 | 11/2021 | Duggal et al. |
| 2022/0104181 A1 | 3/2022 | Velev et al. |
| 2022/0109698 A1 | 4/2022 | Roh |
| 2022/0247720 A1 | 8/2022 | Kim |
| 2023/0247003 A1 | 8/2023 | Chanak et al. |

FOREIGN PATENT DOCUMENTS

| | | |
|---|---|---|
| CN | 107445011 A | 12/2017 |
| EP | 3254415 A1 | 12/2017 |
| JP | 2007243655 A | 9/2007 |
| JP | 2009163546 A | 7/2009 |
| JP | 2010011122 A | 1/2010 |
| JP | 2011015327 A | 1/2011 |
| JP | 2011166704 A | 8/2011 |
| JP | 5239341 B2 | 7/2013 |
| JP | 2015053069 A | 3/2015 |
| JP | 2016189127 A | 11/2016 |
| JP | 2017535843 A | 11/2017 |
| JP | 2017537501 A | 12/2017 |
| JP | 2018508140 A | 3/2018 |
| JP | 2018524843 A | 8/2018 |
| JP | 2019079504 A | 5/2019 |
| KR | 1020020088728 A | 11/2002 |
| KR | 1020030075810 A | 9/2003 |
| KR | 100692653 B1 | 3/2007 |
| KR | 1020070037650 A | 4/2007 |
| KR | 100748698 B1 | 8/2007 |
| KR | 1020070102698 A | 10/2007 |
| KR | 100856674 B1 | 8/2008 |
| KR | 1020100008740 A | 1/2010 |
| KR | 101020470 B1 | 2/2011 |
| KR | 1020120045859 A | 5/2012 |
| KR | 101173583 B1 | 8/2012 |
| KR | 1020130045919 A | 5/2013 |
| KR | 1020130076798 A | 7/2013 |
| KR | 1020140055857 A | 5/2014 |
| KR | 1020140074357 A | 6/2014 |
| KR | 101481337 B1 | 1/2015 |
| KR | 1020150013453 A | 2/2015 |
| KR | 1020150088494 A | 8/2015 |
| KR | 101561108 B1 | 10/2015 |
| KR | 101578193 B1 | 12/2015 |
| KR | 1020160029660 A | 3/2016 |
| KR | 1020160056118 A | 5/2016 |
| KR | 1020160123069 A | 10/2016 |
| KR | 1020170010835 A | 2/2017 |
| KR | 101743559 B1 | 6/2017 |
| KR | 1020170063795 A | 6/2017 |
| KR | 1020170132608 A | 12/2017 |
| KR | 1020180006413 A | 1/2018 |
| KR | 1020180019273 A | 2/2018 |
| KR | 1020180030023 A | 3/2018 |
| KR | 1020180032864 A | 4/2018 |
| KR | 101861201 B1 | 5/2018 |
| KR | 1020180062838 A | 6/2018 |
| KR | 1020180086964 A | 8/2018 |
| KR | 101910605 B1 | 10/2018 |
| KR | 1020180132868 A | 12/2018 |
| KR | 20190037088 A | 4/2019 |
| KR | 1020190036504 A | 4/2019 |
| KR | 1020190052541 A | 5/2019 |
| KR | 1020190073114 A | 6/2019 |
| KR | 102119257 B1 | 6/2020 |
| KR | 102146568 B1 | 8/2020 |
| WO | WO 2013170177 A1 | 11/2013 |
| WO | 2014062337 A1 | 4/2014 |
| WO | 2016057177 A1 | 4/2016 |
| WO | 2016190641 A1 | 12/2016 |
| WO | 2017016473 A1 | 2/2017 |
| WO | WO 2017081864 A1 | 5/2017 |
| WO | WO 2017126556 A1 | 7/2017 |
| WO | WO 2018116123 A1 | 6/2018 |
| WO | 2021060856 A1 | 4/2021 |

OTHER PUBLICATIONS

Glatz, Eduard, et al.; Classifying Internet One-way Traffic; Proceedings of the 12th ACM Sigmetrics/Performance joint international conference on Measurement and Modeling of Computer Systems (SIGMETRICS 12); Association for Computing Machinery; New York, NY, USA; May 15, 2012; 29 Pages.
Bilger, Brent, et al.; Cloud Security Alliance (CSA); Software-Defined Perimeter Working Group (SDP) Specification 1.0; Apr. 2014; 28 Pages.
Garbis, Jason, et al.; Cloud Security Alliance (CSA); Software-Defined Perimeter Architecture Guide; Mar. 10, 2020; 43 Pages.
Waliyi, Adebayo Gbenga; Study And Implementation Of Wireless Sensor Networks To Manage Energy In A Smart Home; African University of Science and Technology; AUST Institutional Repository; Abuja, Nigeria; Dec. 15, 2017; 69 Pages.
Ikuta, Takayuki, et al.; Software Defined Perimeter (SDP) Usage Scenario Collection, Version 1.0; Japan Cloud Security Alliance, SDP Working Group; Apr. 25, 2019; 52 Pages.
Korean Office Action; Application No. 10-2020-0117543; Mailed: Nov. 13, 2020; 6 pages.
Korean Notice of Allowance; Application No. KR 10-2020-0105345; Dated: May 2, 2021.
Japanese Office Action; Application No. 2021-039780; Issued: Jun. 8, 2021; 13 Pages.
Extended European Search Report; Application No. 21162189.1; Completed: Jul. 7, 2021; Issued: Jul. 16, 2021; 44 Pages.
U.S. Notice of Allowance; U.S. Appl. No. 16/580,974; Issued: Mar. 14, 2022; 8 Pages.
Extended European Search Report dated Oct. 28, 2022 for European Pat. App. No. 20868832.5.
Extended European Search Report dated Oct. 17, 2022 for European Pat. App. No. 20868932.3.
Japanese First Office Action; Application No. 2022-515499; 7 Pages.
Japanese Office Action; Application No. 2022002658; Issued: Mar. 3, 2022; 10 Pages.
Office Action dated Dec. 5, 2023 for Japanese application No. 2023-136154.
Machine Translation for JP 2016189127 A.
Machine Translation for JP 2015053069 A.
Office Action dated Feb. 12, 2024 for U.S. Appl. No. 17/656,155.
International Search Report and Written Opinion of the International Searching Authority; Application No. PCT/KR2020/012929; Completed: Jan. 5, 2021; Mailing Date: Jan. 5, 2021; 11 Pages.

* cited by examiner

SYSTEM FOR AUTHENTICATING AND CONTROLLING NETWORK ACCESS OF TERMINAL, AND METHOD THEREFOR

CROSS-REFERENCE TO RELATED APPLICATIONS

The present application is the National Stage of International Application No. PCT/KR2020/012929, filed on Sep. 24, 2020, which claims priority from U.S. patent application Ser. No. 16/580,866, filed on Sep. 24, 2019, and Ser. No. 16/580,974, filed on Sep. 24, 2019. International Application No. PCT/KR2020/012929 claims priority to Korean Patent Application No. 10-2020-0100062, filed on Aug. 10, 2020. The present application is a continuation-in-part of U.S. patent application Ser. No. 16/580,974, filed on Sep. 24, 2019. All prior applications are herein incorporated by reference.

TECHNICAL FIELD

Embodiments disclosed in this specification relate to a technology for authenticating and controlling network access of a terminal in a network environment.

BACKGROUND ART

A plurality of devices may access data over a network. For example, a smartphone may transmit or receive data with a server on the Internet. The network may include a private network such as the intranet as well as a public network such as the Internet.

A technology for restricting access to the network based on transmission control protocol (TCP)/Internet protocol (IP) is being applied to control indiscriminate access to a network. For example, a network access controller (NAC) allows an authorized terminal to access a network by receiving the authorized IP address and blocks an unauthorized terminal by using address resolution protocol spoofing (ARP spoofing) when the unauthorized terminal uses an unauthorized IP address. A firewall refers to a method of determining whether to allow transmission of a data packet, based on source IP, destination IP, and port information, which are included in IP header information, and a policy. A virtual private network (VPN) refers to a method that guarantees the integrity and confidentiality of data packets by using a tunnel, to which encryption is applied, on the TCP/IP protocol. Nowadays, the number of companies using two or more security technologies among NAC, a firewall, and VPN is increasing. Besides the security technologies, a key-in method (e.g., entering an ID and a password) or a multi-factor authentication method is used to authenticate a user's identity during the first network access.

DISCLOSURE

Technical Problem

ARP spoofing may be a load on a network. Recently, a technology for bypassing the ARP spoofing has been developed. The firewall may be used to control the flow of data packets, and thus may not be directly involved in a process of generating a connection between two nodes. VPN is vulnerable to managing the flow of data packets after a tunnel is generated. Furthermore, advanced persistent threat (APT) uses a method of hiding malware capable of taking control of a terminal by executing a key logger in the terminal. A method of authenticating a user's identity is not performed after the first network access. Accordingly, credential stuffing using an ID and a password, which are obtained by using a key logger during VPN or NAC-based access, may occur frequently. Besides, the technologies are based on TCP/IP, and thus may be vulnerable to security on another layer (e.g., an application layer) among open system interconnection (OSI) layers.

Various embodiments disclosed in the specification provide a system for solving the above-described problems in a network environment, and a method therefor.

Technical Solution

According to an embodiment disclosed in the specification, a terminal may include a communication circuit, a processor operatively connected to the communication circuit, and a memory operatively connected to the processor and storing a target application and an access control application. The memory may store instructions that cause, when executed by the processor, the terminal to detect a network access event for a destination network of the target application through the access control application, to determine whether data flow information corresponding to identification information of the target application and the destination network is present, through the access control application, to determine whether authentication of a data flow indicated by the data flow information is valid, through the access control application, and to drop a data packet of the target application when the data flow information is not present or the authentication of the data flow is not valid, or to transmit the data packet of the target application when the data flow information is present and the authentication of the data flow is valid.

According to an embodiment disclosed in the specification, a server may include a communication circuit, a memory storing a database, and a processor operatively connected to the communication circuit and the memory. The processor may be configured to receive a first request for network access of a target application, which is stored in a terminal, to a destination network from an access control application of the terminal, the first request including identification information of a control flow, identification information of the target application, and identification information of the destination network, to determine whether the target application is accessible, based on information included in the first request and the database, to determine whether authentication of a data flow corresponding to the target application and the destination network is necessary, based on the database, the identification information of the target application, and the identification information of the destination network when the target application is accessible, and to transmit the determination result to the access control application by using the communication circuit.

According to an embodiment disclosed in the specification, a gateway may be configured to receive a data packet from a terminal, to determine whether the received data packet is received through a tunnel authorized by an external server, to determine whether the data packet is valid, based on authentication information included in the data packet, and to drop the data packet when the data packet is not received through the authorized tunnel or the data packet is not valid, or to forward the data packet to a destination network when the data packet is received through the authorized tunnel and the data packet is valid.

Advantageous Effects

According to embodiments disclosed in the specification, a terminal may block data packet transmission of an unauthorized network, terminal, user, or application.

Furthermore, embodiments disclosed in the specification may solve the problem of setting and retrieving a policy and may prevent bypass attacks as compared to a wide range of IP address-based network security technologies such as NAC.

Moreover, embodiments disclosed in the specification may block a man-in-the-middle (MITM) attack in a zero trust network environment, and thus tunnel-based access control may be performed as compared to VPN that provides only section protection.

Moreover, embodiments disclosed in the specification may block an access trial of a detour data packet to a destination network when enhanced authentication is not performed at the time of network access, by blocking the network access at the stage of a terminal and gateway.

Moreover, an access control application according to embodiments disclosed in the specification may fundamentally block credential stuffing that malware, which is hidden in a terminal and is being executed, attempts to access a target network by using authentication information obtained in advance.

Moreover, an access control application according to embodiments disclosed in the specification may perform enhanced authentication incapable of being collected by a key logger while accessing a network depending on a controller's instructions, and may allow the network access only through valid authentication, thereby providing a secure security element.

Besides, a variety of effects directly or indirectly understood through the specification may be provided.

Figure 1:
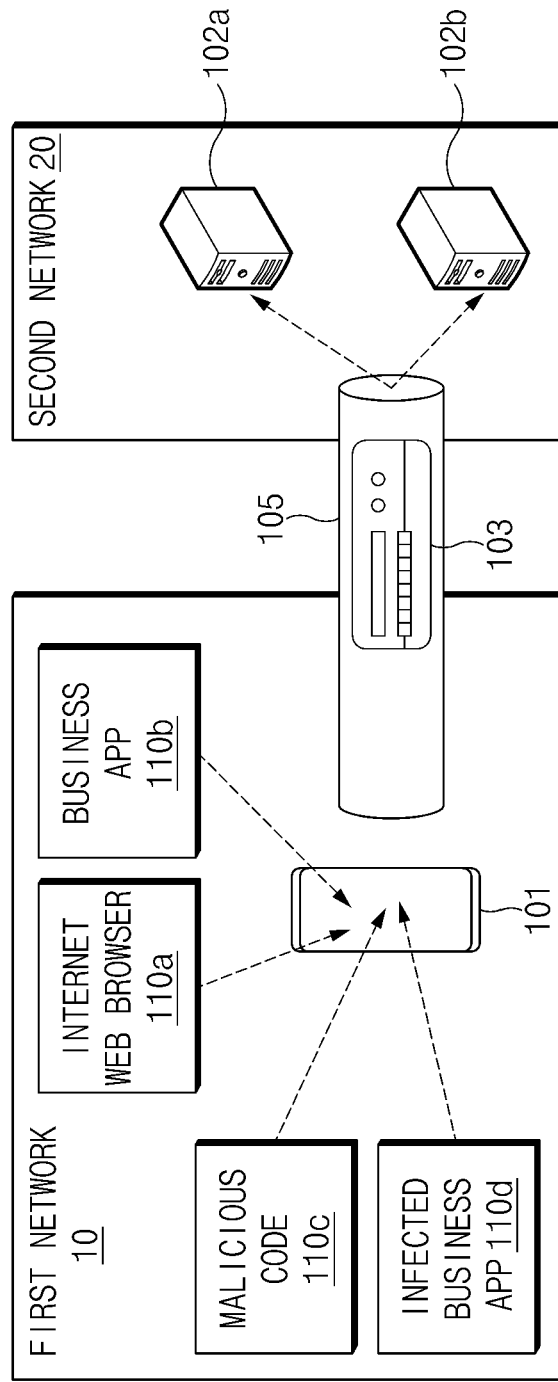
FIG. 1 illustrates an environment including a plurality of networks.

With regard to description of drawings, the same or similar components will be marked by the same or similar reference signs.

MODE FOR INVENTION

Hereinafter, various embodiments of the present disclosure will be described with reference to accompanying drawings. However, those of ordinary skill in the art will recognize that modification, equivalent, and/or alternative on various embodiments described herein may be variously made without departing from the scope and spirit of the present disclosure.

In this specification, the singular form of the noun corresponding to an item may include one or more of items, unless interpreted otherwise in context. In the present disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

Each component (e.g., a module or a program) of components described in this specification may include a single entity or a plurality of entities. According to various embodiments, one or more components of the corresponding components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, programs, or other components may be executed by a successive method, a parallel method, a repeated method, or a heuristic method. Alternatively, at least one or more of the operations may be executed in another order or may be omitted, or one or more operations may be added.

The term "module" used herein may include a unit, which is implemented with hardware, software, or firmware, and may be interchangeably used with the terms "logic", "logical block", "part", or "circuit". The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the present disclosure may be implemented with software (e.g., a program or an application) including one or more instructions stored in a storage medium (e.g., a memory) readable by a machine. For example, the processor of a machine may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily.

A method according to various embodiments disclosed in the specification may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

FIG. 1 illustrates an environment including a plurality of networks.

Referring to FIG. 1, a first network 10 and a second network 20 may be different networks from each other. For example, the first network 10 may be a public network such as Internet, and the second network 20 may be a private network such as an intranet or VPN.

The first network 10 may include a terminal 101. In various embodiments described with reference to FIGS. 1 to 16, 'terminal(s)' may be various types of devices capable of performing data communication. For example, the terminal 101 may include a portable device such as a smartphone or tablet, a computer device such as a desktop or laptop, a multimedia device, a medical device, a camera, a wearable device, a virtual reality (VR) device, or a home appliance device, but is not limited to the devices described above. The terminal 101 may also be referred to as an 'electronic device' or a 'node'.

The terminal 101 may attempt to access the second network 20 and may transmit data to servers 102a and 102b included in the second network 20. The terminal 101 may transmit data to the servers 102a and 102b through a gateway 103 and a tunnel 105. FIG. 1 illustrates an example in which the second network 20 includes only a server. However, according to various embodiments, the second network 20 may further include an electronic device such as the terminal 101 or a terminal.

When it is approved that the terminal 101 accesses the first network 10, the terminal 101 may communicate with all servers included in the first network 10, and thus the terminal 101 may be exposed from attacks by malicious programs. For example, in addition to trusted and/or secure applications such as an Internet web browser 110a and a business application 110b, the terminal 101 may receive data of untrusted or unsecured applications such as a malicious code 110c and an infected business application 110d.

The terminal 101 infected by a malicious program may attempt to access the second network 20 and/or to transmit data. When the second network 20 is formed based on IP, such as VPN, it may be difficult for the second network 20 to individually monitor a plurality of devices included in the second network 20. The second network 20 may be vulnerable to security for an application layer or a transport layer in an OSI layer. Also, when the terminal 101 includes a malicious application after a tunnel has already been generated, the data of the malicious application may be delivered to another electronic device in the second network 20.

Figure 2:
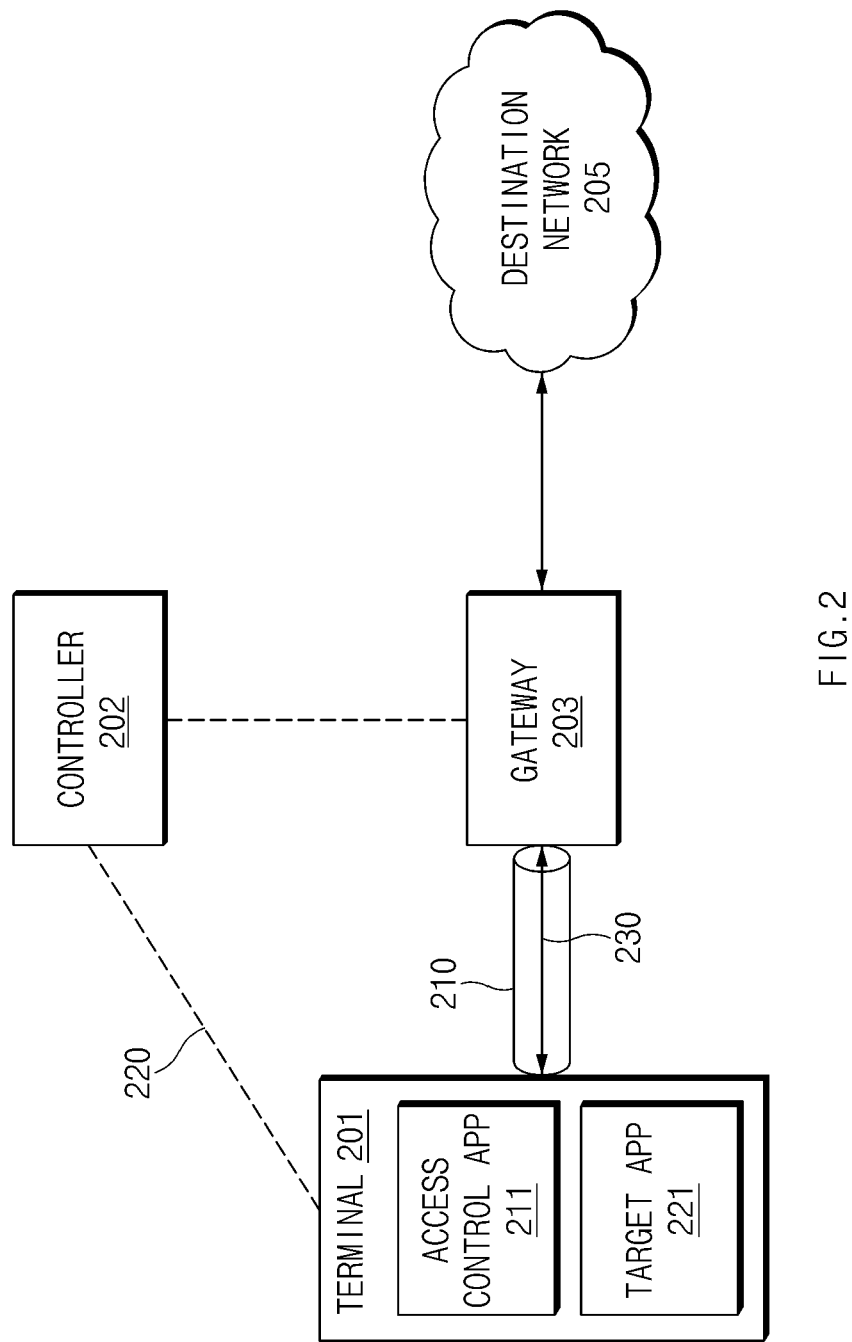
FIG. 2 illustrates architecture in a network environment, according to various embodiments.

FIG. 2 illustrates architecture in a network environment, according to various embodiments.

Referring to FIG. 2, the number of a terminal 201, a gateway 203, and a destination network 205 is not limited to the number shown in FIG. 2. For example, the terminal 201 may transmit data to a plurality of destination networks through a plurality of gateways, and a controller 202 may manage a plurality of terminals and a gateway. The terminal 201 may perform a function identical or similar to that of the terminal 101 shown in FIG. 1; the gateway 203 may perform a function identical or similar to that of the gateway 103 shown in FIG. 1; and, the destination network 205 may have a structure identical or similar to that of the first network 10 or the second network 20 of FIG. 1.

For example, the controller 202 may be a server (or a cloud server). The controller 202 may guarantee reliable data transmission in a network environment by managing data transmission between the terminal 201, the gateway 203, and another network (e.g., the destination network 205). For example, the controller 202 may manage access of the terminal 201 to the destination network 205 through policy information or blacklist information, may relay the generation of an authorized tunnel 210 between the terminal 201 and the gateway 203, or may remove the tunnel 210 depending on the security event collected from the terminal 201 or the gateway 203. The terminal 201 may communicate with the destination network 205 only through the tunnel 210 authorized by the controller 202. When the authorized tunnel 210 is not present, the terminal 201 may be blocked from accessing the destination network 205. According to an embodiment, the controller 202 may transmit or receive control data packets to or from the terminal 201 to perform various operations (e.g., registration, approval, authentication, update, and termination) associated with network access of the terminal 201. A flow (e.g., 220) through which a control data packet is transmitted may be referred to as a control flow.

The gateway 203 may be positioned on the boundary of the network, to which the terminal 201 belongs, or on the boundary of the destination network 205. The plurality of gateways 203 may be present. The gateway 203 may forward only a data packet, which is received through the authorized tunnel 210, from among data packets received from the terminal 201 to the destination network 205. A flow (e.g., 230) through which a data packet is transmitted between the terminal 201 and the gateway 203 or between the gateway 203 and the destination network 205 may be referred to as a "data flow". According to an embodiment, the gateway 203 may be connected to the controller 202 based on a cloud. The gateway 203 may generate the tunnel 210, which is authorized and which is connected to the terminal 201, under the control of the controller 202. According to an embodiment, even though a data packet transmitted from terminal 201 is received through the authorized tunnel, the gateway 203 may control the forwarding of the data packet depending on whether the data packet requires authentication.

The terminal 201 may include an access control application 211, which manages network access of an application stored in the terminal 201, and a network driver (not shown). For example, when an event that a target application 221 (e.g., an application (one of 110a to 110d) of FIG. 1) included in the terminal 201 accesses the destination network 205 occurs, the access control application 211 may determine whether access of the target application 221 is possible. When the access of the target application 221 is possible, the access control application 211 may transmit a data packet to the gateway 203 through the tunnel 210. As another example, the access control application 211 may determine whether authentication is required depending on the target application 221 and the destination network 205 (e.g., IP or port information). When the authentication is required, the access control application 211 may not transmit a data packet until the authentication is completed. The access control application 211 may control the transmission of a data packet through a kernel including an operating system and a network driver within the terminal 201.

Figure 3:
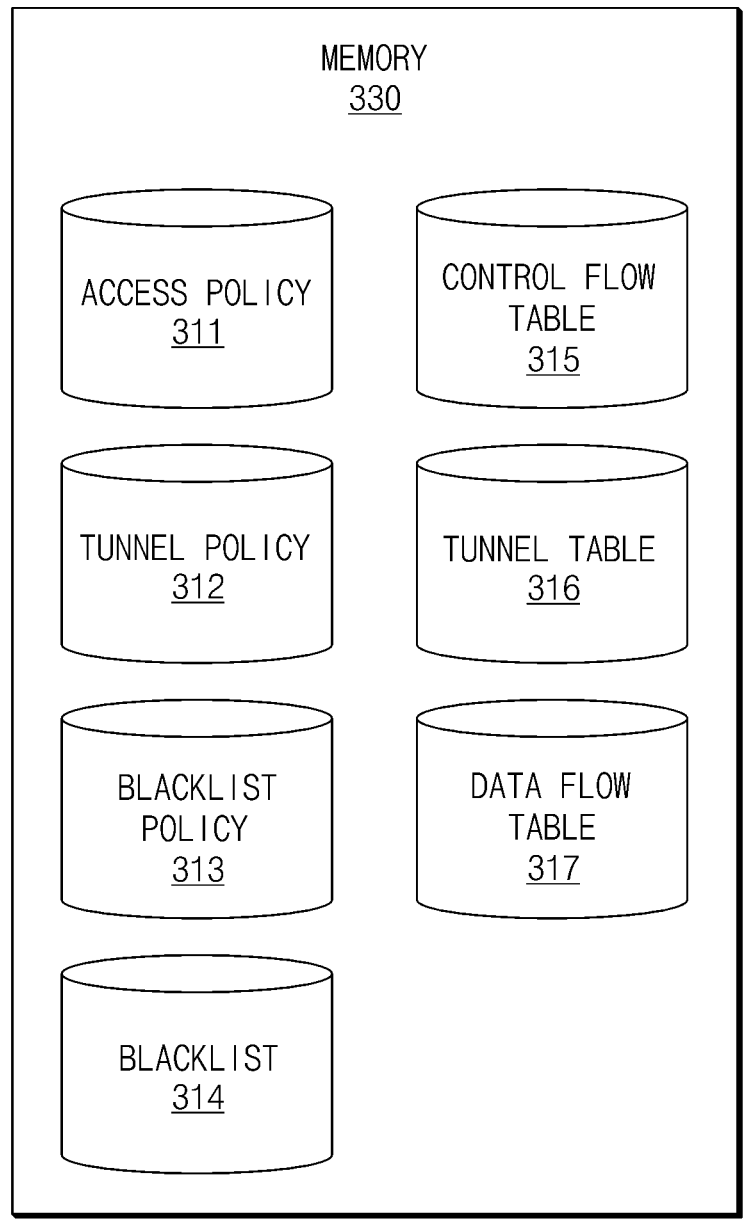
FIG. 3 is a functional block diagram illustrating a database stored in a controller, according to various embodiments.

FIG. 3 is a functional block diagram illustrating a database stored in a controller (e.g., the controller 202 of FIG. 2), according to various embodiments. FIG. 3 illustrates only a memory 330. However, a controller may further include a communication circuit (e.g., a communication circuit 430 of FIG. 4) for communicating with an external electronic device (e.g., the terminal 201 or the gateway 203 in FIG. 2) and a processor (e.g., a processor 410 of FIG. 4) for controlling overall operations of the controller.

Referring to FIG. 3, the controller may store, in the memory 330, databases 311 to 317 for controlling network access and data transmission.

The access policy database 311 may include information associated with a network, service, and/or authentication that an identified network, an identified terminal, an identified user, an identified application, or an unidentified user (e.g., a guest) is capable of accessing. For example, when a request for access to the destination network is received from the terminal, the controller may determine whether the identified network (e.g., a network to which the terminal belongs), terminal, user (e.g., a user of the terminal), and/or application (e.g., an application included in the terminal) is capable of accessing a destination network, whether the authentication for them is required, and an authentication method, based on the access policy database 311.

The tunnel policy database 312 may include an encryption method, encryption level information, and the type of a tunnel, which is to be connected between a source node (e.g., a terminal) and a gateway present on the boundary of a network on a connection path. For example, when a request for the access to the destination network is received from a terminal, the controller may provide the terminal with an optimal tunnel for accessing the destination network and information about the optimal tunnel based on the tunnel policy database 312.

The blacklist policy database 313 may include a policy for permanently or temporarily blocking the access of a specific terminal. The blacklist policy database 313 may be generated based on information (e.g., at least one of a terminal identifier (ID), an IP address, a media access control (MAC) address, or a user ID) identified through the risk level, occurrence period, and/or behavioral analysis of a security event among security events periodically collected at a terminal or gateway.

The blacklist database 314 may include a list of at least one of a terminal, an IP address, a MAC address, or a user blocked based on the blacklist policy database 313. For example, when identification information of the terminal requesting for access to the destination network is included in the blacklist database 314, the controller may isolate the terminal from the destination network by denying the access request of the terminal.

The control flow table 315 is an example of a session table for managing a flow (e.g., a control flow) of a control data packet generated between a terminal and a controller. When the terminal successfully accesses the controller, the control flow information may be generated by the controller. The control flow information may include at least one of identification information of the control flow, an IP address, a terminal ID, or a user ID which is identified during access to the controller or authentication for the controller. For example, when a request for the access to the destination network is received from the terminal, the controller may search for the control flow information through control flow identification information received from the terminal and then may map at least one of an IP address, a terminal ID, or a user ID included in the found control flow information onto the access policy database 311. Accordingly, the controller may determine whether access of the terminal is possible and whether to generate a tunnel. When enhanced authentication for a specific terminal (or an application or a destination network) is required, authentication request information may include an authentication method, an authentication token, and/or an authentication target.

According to an embodiment, the control flow may have an expiration time. The terminal needs to update the expiration time of the control flow. When the expiration time is not updated during a specific time, the control flow (or the control flow information) may be removed. Besides, when it is determined, depending on the security event collected from the terminal or gateway, that there is a need for immediate access blocking, the controller may remove the control flow depending on an access termination request of the terminal. Because the pre-generated tunnel and data flow are also removed when the control flow is removed, the terminal may be blocked from accessing to the network.

The tunnel table 316 is a table for managing a tunnel connected between the terminal and the gateway. For example, the tunnel may be generated in units of devices or IPs. When a tunnel is generated between the terminal and the gateway, the tunnel table 316 may include tunnel identification information, control flow identification information when the tunnel is dependent on the control flow, a tunnel end point (TEP), a tunnel start point (TSP), a tunnel algorithm, a tunnel type, and/or additional information for managing the tunnel.

The data flow table 317 is a table for managing a flow (e.g., a data flow) through which the detailed data packet is transmitted between the terminal and the gateway. The data flow may be generated in units of TCP sessions, in units of source terminal applications, or in more detailed units within a tunnel generated in units of terminals or IPs. The data flow table 317 may include data flow identification information, control flow identification information when the data flow is dependent on the control flow, an application ID for determining whether a data packet transmitted from the terminal is an authorized data packet, a destination IP address, and/or a service port. Also, the data flow table 317 may include identification information of a tunnel, through which a data flow is to be used. Moreover, the data flow table 317 may include a header (or header information) for determining whether a data packet is valid. Furthermore, the data flow table 317 may further include whether a data flow header, which is authentication information, is inserted into a data packet, a method of inserting a header, whether the authentication of a data flow is required, an authentication state of a data flow, and/or an authentication expiration time of a data flow.

Figure 4:
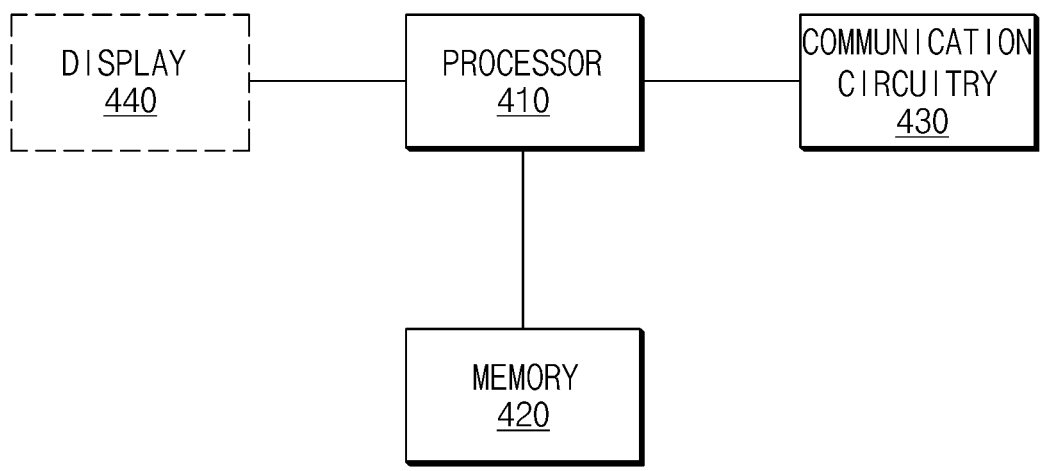
FIG. 4 is a functional block diagram of a terminal, according to various embodiments.

FIG. 4 is a functional block diagram of a terminal (e.g., the terminal 201 of FIG. 2), according to various embodiments.

Referring to FIG. 4, a terminal may include the processor 410, a memory 420, and the communication circuit 430. According to an embodiment, the terminal may further include a display 440 for interfacing with a user.

The processor 410 may control overall operations of the terminal. In various embodiments, the processor 410 may include a single processor core or may include a plurality of processor cores. For example, the processor 410 may include a multi-core such as a dual-core, a quad-core, a hexa-core, or the like. According to embodiments, the processor 410 may further include a cache memory positioned inside or outside the processor 410. According to embodiments, the processor 410 may be configured with one or more processors. For example, the processor 410 may include at least one of an application processor, a communication processor, or a graphical processing unit (GPU).

All or part of the processor 410 may be electrically or operatively coupled with or connected to another component (e.g., the memory 420, the communication circuit 430, or the display 440) within the terminal. The processor 410 may receive a command from other components of the terminal, may interpret the received command, and may perform calculations or process data depending on the interpreted command. The processor 410 may interpret and process messages, data, instructions, or signals received from the memory 420, the communication circuit 430, or the display 440. The processor 410 may generate new messages, data, instructions, or signals based on the received messages, data, instructions, or signals. The processor 410 may provide the processed or generated messages, data, instructions, or signals to the memory 420, the communication circuit 430, or the display 440.

The processor 410 may process data or signals, which is generated by a program and occurs in a program. For example, the processor 410 may request instructions, data, or signals from the memory 420 to execute or control a program. The processor 410 may write (or store) or update instructions, data, or signals to the memory 420 to execute or control the program.

The memory 420 may store instructions for controlling the terminal, control command codes, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read only memory (ROM), a programmable ROM (PROM), an electrically programmable ROM (EPROM), an electrically erasable programmable ROM (EEPROM), a flash memory, and the like.

The memory 420 may further include nonvolatile media (medium) such as a hard disk drive (HDD), a solid state disk (SSD), an embedded multimedia card (eMMC), and universal flash storage (UFS).

According to an embodiment, the memory 420 may store some of information included in a memory (e.g., the memory 330 of FIG. 3) of the controller. For example, the memory 420 may store the tunnel table 316 and the data flow table 317 that are described with reference to FIG. 3.

The communication circuit 430 may establish a wired or wireless communication connection between the terminal and an external electronic device (e.g., the controller 202 or the gateway 203 of FIG. 2) and may support communication execution through the established communication connection. According to an embodiment, the communication circuit 430 may include a wireless communication circuit (e.g., a cellular communication circuit, a short-range wireless communication circuit, or a global navigation satellite system (GNSS) communication circuit) or a wired communication module (e.g., a local area network (LAN) communication circuit or a power line communication circuit) and may communicate with the external electronic device by using a corresponding communication circuit among them through the short-range communication network such as a Bluetooth, a WiFi direct, or an infrared data association (IrDA)) or the long-distance communication network such as a cellular network, an Internet, or a computer network. The above-mentioned various communication circuits 430 may be implemented into one chip or may be respectively implemented into separate chips.

The display 440 may output content, data, or a signal. In various embodiments, the display 440 may display image data processed by the processor 410. In embodiments, the display 440 may be configured with an integrated touch screen by being coupled with a plurality of touch sensors (not shown) capable of receiving a touch input or the like. When the display 440 is configured with a touch screen, the plurality of touch sensors may be disposed above the display 440 or below the display 440.

Figure 5:
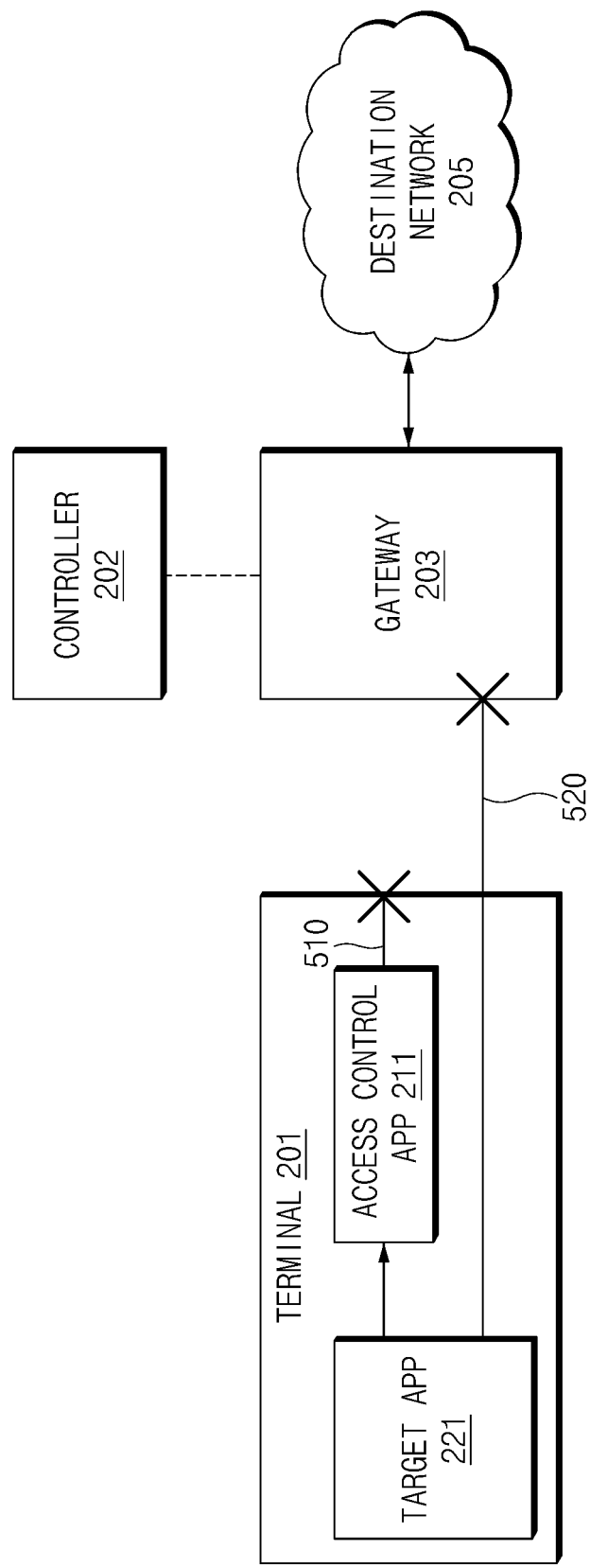
FIG. 5 illustrates an operation of controlling transmission of a data packet, according to various embodiments.

FIG. 5 illustrates an operation of controlling transmission of a data packet, according to various embodiments.

Referring to FIG. 5, the access control application 211 may detect a request for access to the destination network 205 of the target application 221 and then may determine whether the terminal 201 or the target application 221 is connected to the controller 202. When the terminal 201 or the target application 221 is not connected to the controller 202, the access control application 211 may block transmission of a data packet from a kernel including an operating system or network driver (operation 510). The terminal 201 may block the access of a malicious application in the application layer of an OSI layer in advance through the access control application 211.

According to another embodiment, when the access control application 211 is not installed in the terminal 201 or a malicious application bypasses the control of the access control application 211, an unauthorized data packet may be transmitted from the terminal 201. In this case, the gateway 203, which is present on the boundary of a network, blocks data packets received through an unauthorized tunnel (operation 520), a data packet (e.g., a data packet for generating a TCP session) transmitted from the terminal 201 may not reach the destination network 205. In other words, the terminal 201 may be isolated from the destination network 205.

Figure 6:
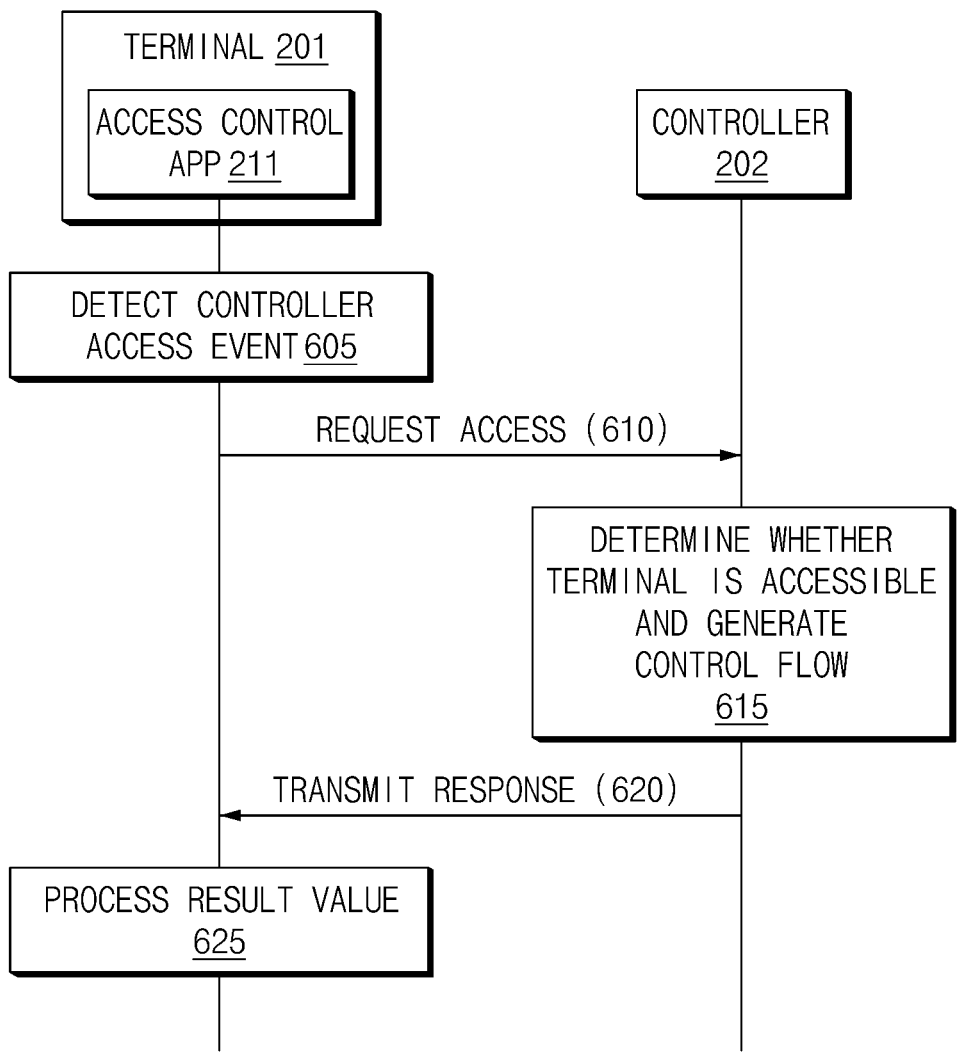
FIG. 6 shows a signal flow diagram for accessing a controller, according to various embodiments.
Figure 7:
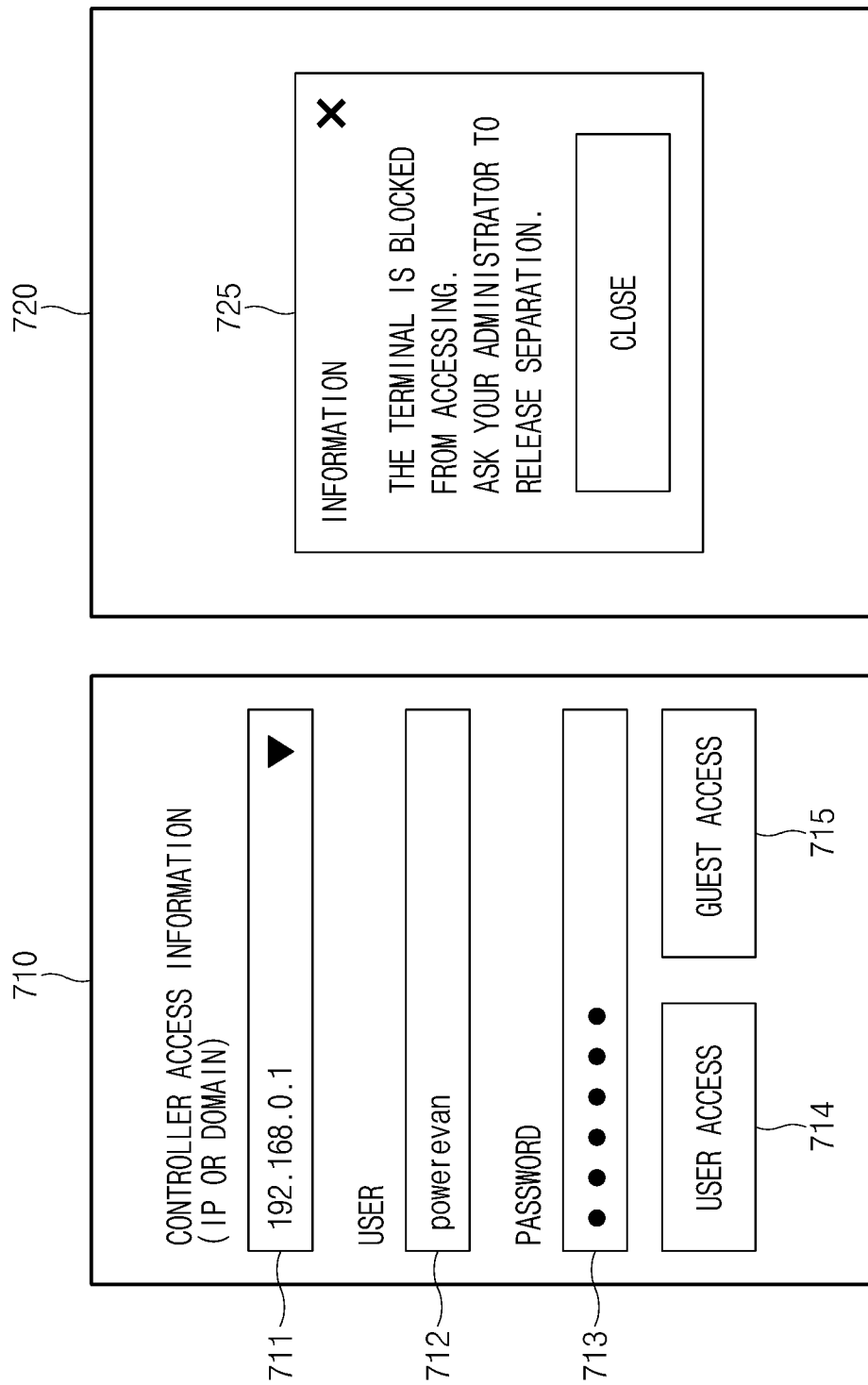
FIG. 7 shows a user interface screen for accessing a controller, according to various embodiments.

FIGS. 6 and 7 illustrate an operation of accessing a controller, according to various embodiments. FIG. 6 shows a signal flow diagram for accessing a controller. FIG. 7 shows a user interface screen for accessing a controller.

For the terminal 201 to connect to a destination network (e.g., the destination network 205 in FIG. 2), there is a need to be authorized by the controller 202, and thus the access control application 211 of the terminal 201 may attempt to access a controller of the terminal 201, by requesting the controller 202 to generate a control flow.

Referring to FIG. 6, in operation 605, the terminal 201 may detect a controller access event. For example, the access control application 211 is installed and executed within the terminal 201, and then the terminal 201 may detect that access to the controller 202 is requested, through the access control application 211.

For example, referring to FIG. 7, when the access control application 211 is executed, the terminal 201 may display a user interface screen 710 for receiving information necessary to access a controller. The user interface screen 710 may include an input window 711 for entering an IP or domain of the controller 202, an input window 712 for entering a user ID, and/or an input window 713 for entering a password. After information about the input windows 711 to 713 are entered, the terminal 201 may detect a controller access event by receiving a button 714 that allows an authenticated user to access the controller. As another example, when user authentication of the terminal 201 is not yet completed, the terminal 201 may detect the controller access event by receiving a button 715 that allows an unauthorized user (i.e., a guest) to access the controller.

In operation 610, the terminal 201 may make a request for controller access to the controller 202 in response to detecting the controller access event. The terminal 201 may request controller access through the access control application 211. According to an embodiment, the access control application 211 may transmit, to the controller 202, identification information (e.g., a terminal ID, an IP address, or an MAC address) of the terminal 201, the type of the terminal 201, the location of the terminal 201, the environment of the terminal 201, identification information of a network to which the terminal 201 belongs, and/or identification information of the access control application 211.

In operation 615, the controller 202 may identify whether the terminal 201 is accessible, in response to the received request. According to an embodiment, the controller 202 may determine whether the terminal 201 is accessible, based on a database included in a memory (e.g., the memory 330 in FIG. 3) of the controller 202. For example, the controller 202 may determine whether the terminal 201 is accessible, based on whether the information received from the access control application 211 is included in the access policy database and whether the identification information of the terminal 201 and/or a network to which the terminal 201 belongs is included in a blacklist database.

When the terminal 201 is accessible, the controller 202 may generate a control flow between the terminal 201 and the controller 202. In this case, the controller 202 may generate control flow identification information in a form of random numbers and then may store the identification information of the terminal 201 and/or the network, to which the terminal 201 belongs, in a control flow table. Information (e.g., control flow identification information and/or control flow information) stored in the control flow table may be used for user authentication of the terminal 201, information update of the terminal 201, policy check for network access of the terminal 201, and/or a validity check.

When the control flow is generated, in operation 620, the controller 202 may transmit, to the terminal 201, a response to the controller access request. In this case, the controller 202 may transmit the generated control flow identification information to the terminal 201.

In operation 625, the terminal 201 may process a result value depending on the received response. For example, the access control application 211 may store the received control flow identification information and then may display a user interface screen indicating that controller access is completed, to the user. When the controller access is completed, a request for network access of the terminal 201 to a destination network may be controlled by the controller 202.

According to another embodiment, the controller 202 may determine that access of the terminal 201 is impossible. For example, when the identification information of the terminal 201 and/or the network to which the terminal 201 belongs is included in a blacklist database, the controller 202 may determine that access of the terminal 201 is impossible. In this case, in operation 620, the controller 202 may transmit a response indicating that the access of the terminal 201 is impossible, without generating a control flow in operation 615.

When receiving a response indicating that the access of the terminal 201 is impossible, in operation 625, the terminal 201 may output a user interface screen indicating that the access of the terminal 201 is impossible, to the user. For example, referring to FIG. 7, the terminal 201 may display a user interface screen 720 through the access control application 211. The user interface screen 720 indicates that access of the terminal 201 is blocked, and may include a user interface 725 for guiding the release of isolation through an administrator (e.g., the controller 202).

Figure 8:
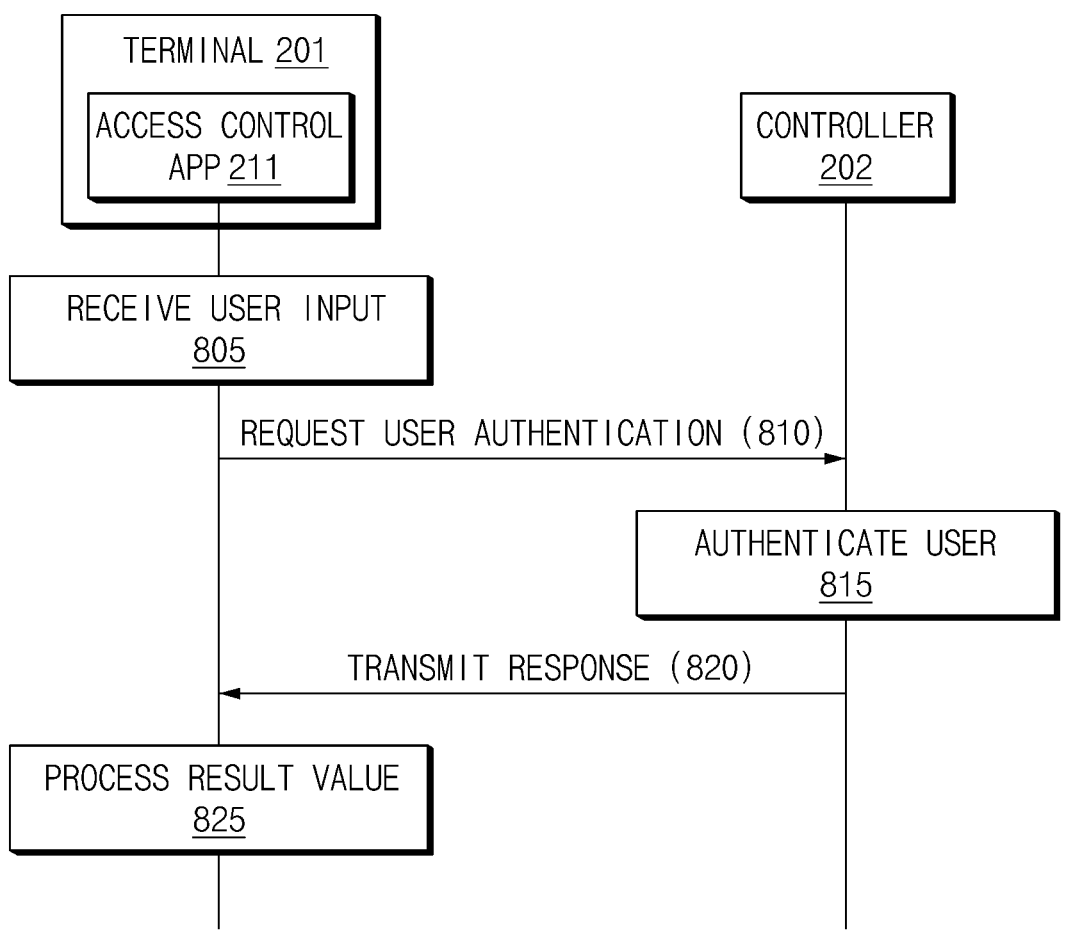
FIG. 8 illustrates a signal flow diagram for user authentication, according to various embodiments.

FIG. 8 illustrates a signal flow diagram for user authentication, according to various embodiments.

For the terminal 201 to receive a permission to access a destination network, the access control application 211 of the terminal 201 may receive authentication for a user of the terminal 201 from the controller 202. The user authentication shown in FIG. 8 may be performed independently of the authentication described with reference to FIGS. 9 and 13. For example, user authentication shown in FIG. 8 may be performed before network access.

Referring to FIG. 8, in operation 805, the terminal 201 may receive an input for user authentication. For example, the input for user authentication may be a user input for entering a user ID and password. As another example, the input for user authentication may be a user input (e.g., biometric information or multi-factor authentication) for more enhanced authentication.

In operation 810, the terminal 201 may make a request for user authentication to the controller 202. For example, the access control application 211 may transmit input information for user authentication to the controller 202. When the control flow between the terminal 201 and the controller 202 is already generated, the access control application 211 may transmit the input information for user authentication together with control flow identification information.

In operation 815, the controller 202 may authenticate a user based on information received from the terminal 201. For example, the controller 202 may determine whether the user is accessible depending on an access policy and whether the user is included in a blacklist, based on a user ID, a password, and/or enhanced authentication information, which are included in the received information, and a database (e.g., the access policy database 311 or the blacklist database 314 of FIG. 3) included in a memory of the controller 202.

When the user is authenticated, the controller 202 may add identification information (e.g., user ID) of the user to identification information of a control flow. The added user identification information may be used for the authenticated user's controller access or network access.

In operation 820, the controller 202 may transmit information indicating that the user is authenticated, as a response to a user authentication request to the terminal 201.

In operation 825, the terminal 201 may process a result value for user authentication. For example, the terminal 201 may display a user interface screen indicating that the user authentication is completed, to the user.

According to another embodiment, the controller 202 may determine that user authentication is impossible. For example, when identification information of the user is included in a blacklist database, the controller 202 may determine that the user authentication is impossible. In this case, in operation 820, the controller 202 may transmit, to the terminal 201, information indicating that user authentication is impossible. In operation 825, the terminal 201 may display a user interface screen indicating that user authentication has failed.

Figure 9:
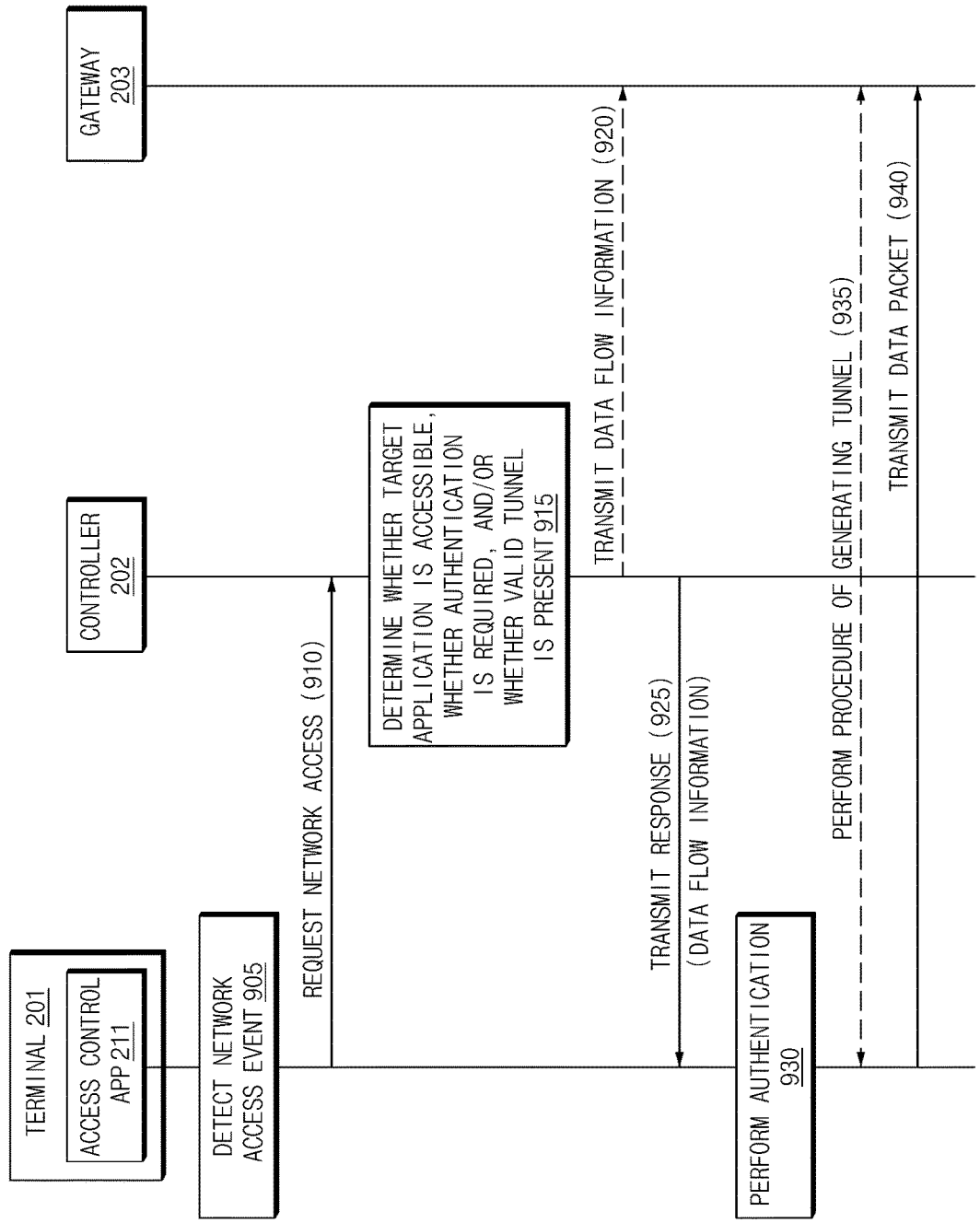
FIG. 9 illustrates a flowchart of a signal for controlling network access, according to various embodiments.
Figure 10A:
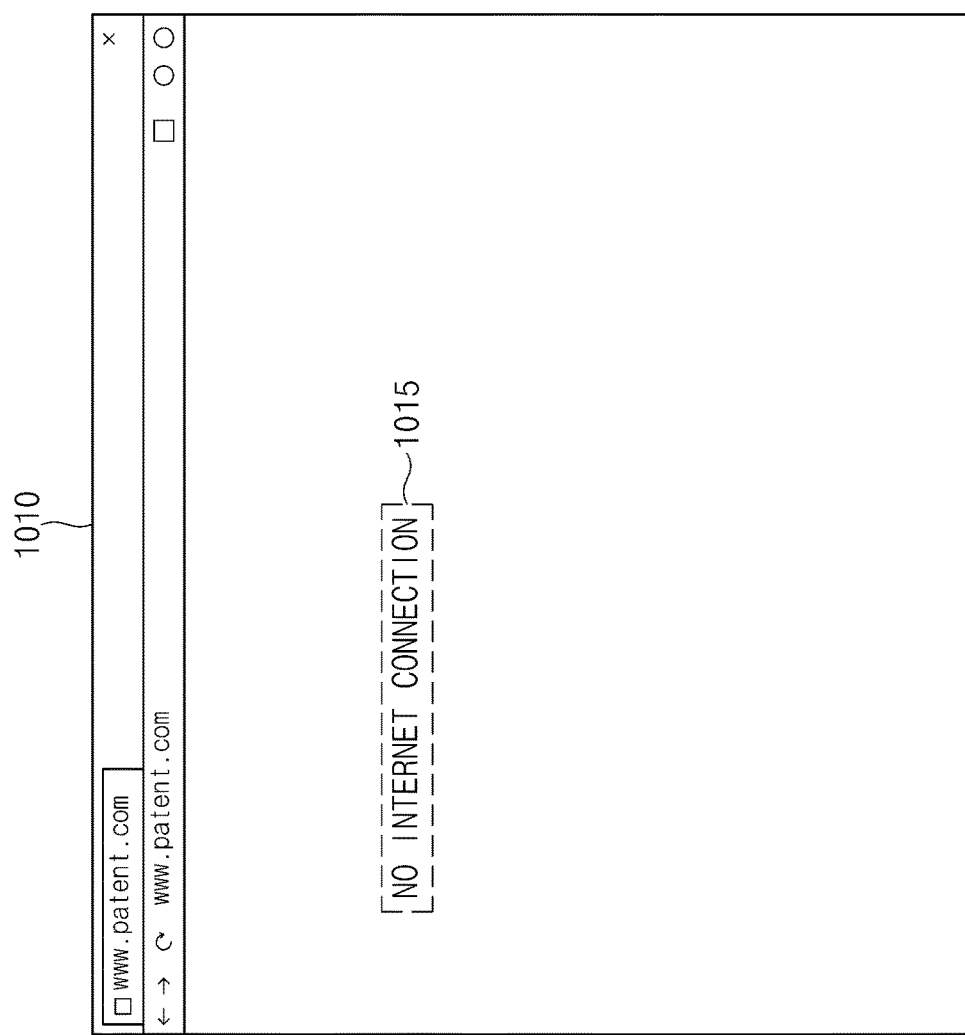
FIG. 10A illustrates a user interface screen when network access is blocked, according to various embodiments.
Figure 10B:
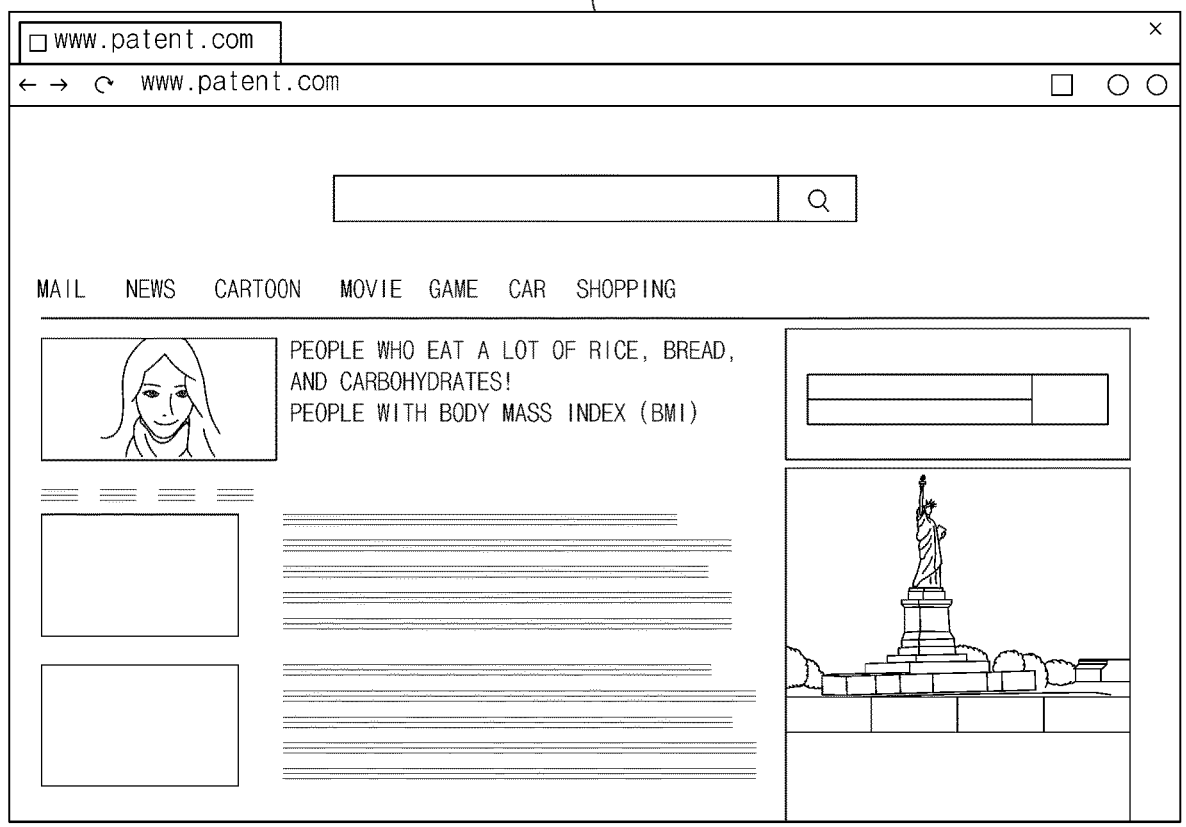
FIG. 10B illustrates a user interface screen when network access is permitted, according to various embodiments.
Figure 10C:
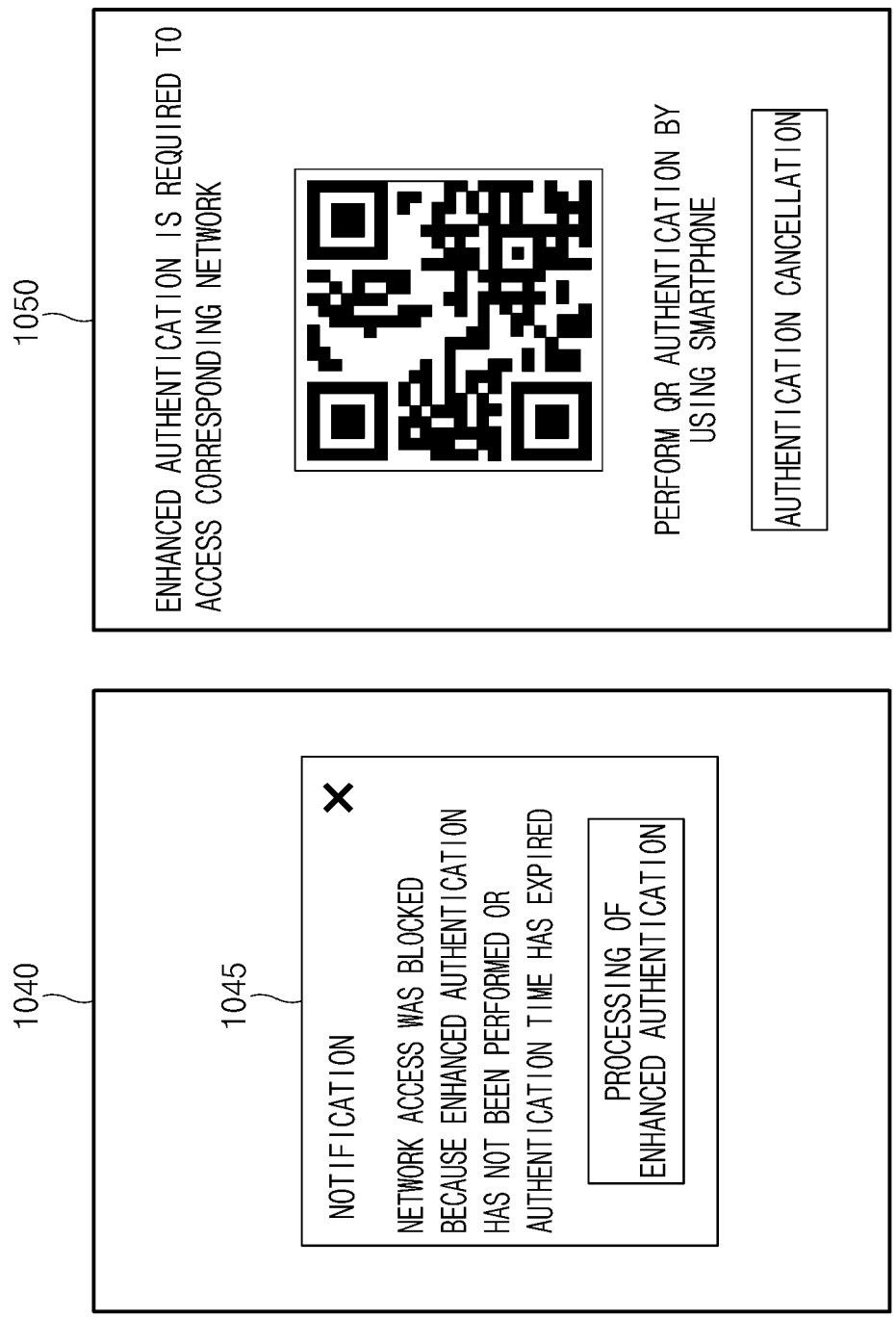
FIG. 10C illustrates a user interface screen for enhanced authentication, according to various embodiments.

FIGS. 9, 10A, 10B, and 10C describe an operation of controlling network access, according to various embodiments. FIG. 9 illustrates a flowchart of a signal for controlling network access. FIG. 10A illustrates a user interface screen when network access is blocked. FIG. 10B illustrates a user interface screen when network access is permitted. FIG. 10C illustrates a user interface screen for enhanced authentication.

After the terminal 201 is authorized from the controller 202, the terminal 201 may guarantee reliable data transmission by controlling network access of other applications stored in the terminal 201 through the access control application 211 of the terminal 201. In detail, the terminal 201 may guarantee more enhanced security by controlling network access of other applications further based on not only an authorized tunnel, but also whether a data flow is authenticated.

Referring to FIG. 9, in operation 905, the access control application 211 may detect a network access event. For example, the access control application 211 may detect that a target application such as a web browser attempts to access a destination network such as the Internet. For example, a user may launch a web browser and may enter and call a web address to be accessed.

In operation 910, the access control application 211 may make a request for network access of the target application to the controller 202. In this case, the access control application 211 may transmit, to the controller 202, identification information of a target application, an IP of an access target, and/or service port information together with identification information of the control flow generated between the terminal 201 and the controller 202.

In operation 915, the controller 202 may determine whether a target application is accessible, whether authentication is required, and/or whether a valid tunnel (or an authorized tunnel) for accessing the destination network is present, based on the request received from the access control application 211.

For example, the controller 202 may determine whether the target application is accessible, based on whether information (e.g., an ID of the target application, an access target ID, and/or service port information) received from the access control application 211 satisfies an access policy corresponding to information (e.g., information of a terminal, a user, and/or a source network) identified in the control flow. When the access of the target application is impossible, in operation 925, the controller 202 may transmit, to the terminal 201, a response indicating that access is impossible. In this case, the access control application 211 may drop a data packet of the target application and may display a user interface screen indicating that access to the network is impossible.

When access to the target application is possible but enhanced authentication is required, the controller 202 may generate authentication request information depending on the enhanced authentication method (e.g., virtual keypad input-based authentication, two-factor authentication between a PC and a smartphone, or two-factor authentication using ARS and SMS) included in the authentication policy and, in operation 925, may transmit a response requesting enhanced authentication to the terminal 201.

When the access to the network is possible and enhanced authentication is not required, the controller 202 may determine whether an authorized tunnel is present between the terminal 201 and the gateway 203. For example, the controller 202 may identify a TEP and/or a tunnel type in a tunnel policy corresponding to a destination network and then may determine whether an authorized tunnel corresponding to the identified TEP is present in a tunnel table. When the authorized tunnel is present, the controller 202 may generate data flow information including information for using a pre-generated tunnel. For example, the data flow information may include a tunnel ID of the pre-generated tunnel, an ID of an application (e.g., an access control application or a target application) authorized to manage access between a terminal, which is TSP, and a gateway, which is TEP, an IP or service port of a destination network, and/or header information to be used for an authenticated data packet. The controller 202 may transmit the generated data flow information to the terminal 201 and the gateway 203 (in operation 920 and operation 925).

When an authorized tunnel is not present, the controller 202 may generate data flow information including information (e.g., a tunnel type, a method, authentication information, and/or the IP and port of TEP) and then may transmit the generated information to the gateway 203 and the terminal 201 (in operation 920 and operation 925).

As another example, when a tunnel, which satisfies a tunnel policy, from among tunnels to be generated between the terminal 201 and the gateway 203 is not present, in operation 925, the controller 202 may notify the terminal 201 that network access is impossible. In this case, the access control application 211 may drop a data packet of the target application and may display a user interface screen indicating that network access is impossible.

The access control application 211 may process a result value depending on the response received in operation 925.

According to an embodiment, when receiving information indicating that network access of the target application is impossible or information indicating that an authorized tunnel is not present, from the controller 202, the access control application 211 may drop the data packet and may output a user interface screen indicating that the network access is impossible. For example, referring to FIG. 10A, the terminal 201 may output a user interface screen 1010 or 1020 indicating that the access to the destination network is blocked, through the display. The user interface screen 1010 or 1020 may include a text 1015 or a pop-up window 1025, which indicates that access is blocked.

According to another embodiment, when information required to generate a tunnel is received from the controller 202, the access control application 211 may generate a tunnel to be connected to the gateway 203 in operation 935 and then may transmit the data packet of the target application through the generated tunnel in operation 940. In this case, the access control application 211 may receive a data packet from the destination network and may process data provided by the destination network. For example, referring to FIG. 10B, the terminal 201 may output the screen 1030 provided from the destination network (e.g., a website), where access is allowed, through a display.

When the generation of a tunnel fails despite attempting to generate a tunnel, the access control application 211 may drop a data packet and may display a user interface screen indicating that network access is impossible.

According to another embodiment, when receiving the tunnel ID of the existing tunnel from the controller 202, the access control application 211 may transmit a data packet of the target application to the gateway 203 through a tunnel corresponding to the tunnel ID in operation 940 without performing an additional tunnel generation procedure.

When a response requesting enhanced authentication is received according to another embodiment, in operation 930, the access control application 211 may perform enhanced authentication. For example, referring to FIG. 10C, the terminal 201 may output a user interface screen 1040 indicating that enhanced authentication is required, through a display. Because the enhanced authentication has not been performed or the authentication time has expired, the user interface screen 1040 may include a pop-up window 1045 indicating that network access is blocked. The terminal 201 may make a request for the enhanced authentication to a user. For example, the terminal 201 may output a user interface screen 1050 that requires authentication (e.g., QR authentication) according to a specified authentication method through a display. Although not shown in FIG. 10C, the terminal 201 may make a request for various types of authentication (e.g., a key-in method, a biometric information input, or multi-factor authentication) in addition to the QR authentication to the user.

When authentication is not required, the access control application 211 may perform operation 935 or operation 940 without performing operation 930.

The access control application 211 and the gateway 203 may add data flow information received from the controller 202 to the data flow table and then may add information about the newly-generated tunnel to a tunnel table.

FIG. 9 illustrates an embodiment in which the access control application 211 directly makes a request for network access to the controller 202 in response to detecting a network access event. However, the access control application 211 may determine whether valid data flow information is present before the access control application 211 requests network access, whether authentication for data flow is valid, and/or whether an authorized tunnel is present, or may check validity of the target application. In addition, the access control application 211 may transmit or drop a data packet depending on the determination result and check result. This will be more fully described with reference to FIGS. 11 and 12.

Figure 11:
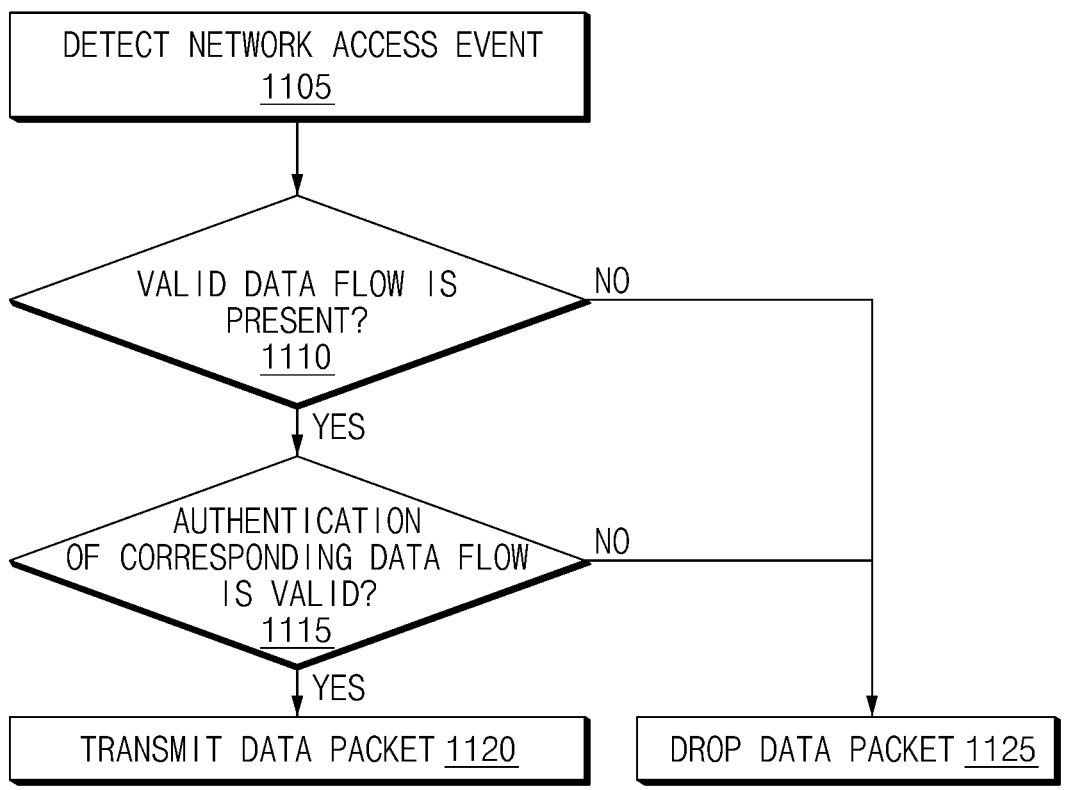
FIG. 11 illustrates a flowchart of an operation for controlling network access in a terminal, according to various embodiments.

FIG. 11 illustrates a flowchart of an operation for controlling network access in a terminal, according to various embodiments. Operations described below may be performed through the terminal 201 of FIG. 9. For example, a terminal may perform operations of FIG. 11 by executing instructions stored in a memory through a processor. The instructions stored in the memory may be software or programs such as the access control application 211 of FIG. 9.

Referring to FIG. 11, in operation 1105, the terminal may detect a network access event. For example, when a user attempts to access a destination network through a target application such as a specific web browser, the terminal may detect the network access event.

In operation 1110, the terminal may determine whether a valid data flow is present. For example, the terminal may identify the IP and service port information of a target application requesting access and a destination (or a destination network) and then may determine whether data flow information corresponding to the information identified is present in the data flow table. When there is no valid data flow (i.e., when there is no data flow information corresponding to the identified information), in operation 1125, the terminal may drop a data packet.

When the valid data flow is present, in operation 1115, the terminal may determine whether the authentication of the corresponding data flow is valid. For example, the terminal may identify the authentication state of the identified data flow (or data flow information). When data flow authentication is required, or the authentication time of a data flow has expired, the terminal may determine that authentication of a data flow is not valid. In this case, in operation 1125, the terminal may drop the data packet.

When authentication of a data flow is valid, in operation 1120, the terminal may transmit a data packet depending on a data flow policy.

FIG. 11 illustrates an operation in which the terminal identifies the validity of a data flow and the validity of the data flow authentication. However, according to a further embodiment, the terminal may determine whether an authorized tunnel is present between the terminal and a gateway positioned on the boundary of the destination network. For example, the access control application may determine whether a tunnel corresponding to identification information of the target application and a destination network (e.g., destination IP) is present in the data flow table stored in the terminal. The authorized tunnel may be a tunnel authorized by an external server (e.g., the controller 202 in FIG. 9). When an authorized tunnel is present, the terminal may transmit a data packet of the target application through the authorized tunnel. When an authorized tunnel is not present, the terminal may drop the data packet.

Figure 12:
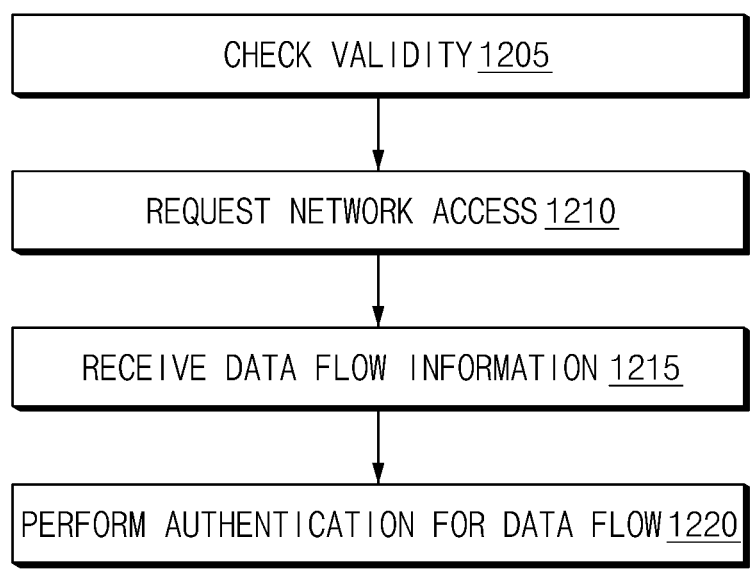
FIG. 12 is a flowchart illustrating another operation for controlling network access in a terminal, according to various embodiments.

FIG. 12 is a flowchart illustrating another operation for controlling network access in a terminal, according to various embodiments. The operation flowchart shown in FIG. 12 may be performed after operation 1125 of FIG. 11.

When a valid data flow is not present, the authentication of a data flow is not valid, or an authorized tunnel is not present, in operation 1205, the terminal may guarantee the integrity and stability of a target application by performing the validity check of the target application. For example, the access control application may determine whether the target application is forged or tampered, or may test a code signing check and/or a fingerprint check. As another example, the access control application may determine whether a target application, an access target IP, and a service port are accessible, based on an access policy database received from an external server. For example, the external server may be a server that manages the network access of a terminal as shown in the controller 202 of FIG. 9. When the validity check of the target application fails, the terminal may drop a data packet without requesting network access.

When the validity check of the target application is successful, in operation 1210, the terminal may make a request for network access to an external server. For example, the terminal may be registered in the external server through the controller access of FIG. 6 or the user authentication procedure of FIG. 8. In this case, a control flow between the terminal and the external server may be generated. According to an embodiment, the terminal may transmit, to the external server, identification information of a target application, IP of an access target, and identification information of a control flow between the terminal and the external server for a network access request.

In operation 1215, the terminal may receive data flow information from an external server. The data flow information may include tunnel information required to transmit a data packet, control flow information allocated to the terminal, information indicating whether authentication is required, identification information for checking whether network access is authenticated, and authentication request information (e.g., an authentication method, an authentication token, and/or an authentication target) required for authentication. When enhanced authentication is not required, the data flow information may not include authentication information. When a pre-generated tunnel is present, the data flow information may include information (e.g., a tunnel ID, an ID of an application authorized to manage access between a terminal, which is TSP, and a gateway, which is TEP, an IP or service port of a destination network, and/or header information to be used for an authenticated data packet) associated with the pre-generated tunnel. As another example, when an authorized tunnel is not present, the data flow information may include information (e.g., a tunnel type, a method, authentication information, and/or IP and port of TEP) required to generate a tunnel.

In operation 1220, the terminal may perform authentication (or enhanced authentication) for data flow based on the received data flow information. For example, the terminal may make a request for a series of information to a user based on an authentication method indicated by the data flow information and then may obtain enhanced authentication information from the user. For example, virtual keypad input-based authentication, two-factor authentication between a PC and a smartphone, and two-factor authentication using ARS and SMS may be used for the enhanced authentication.

Figure 13:
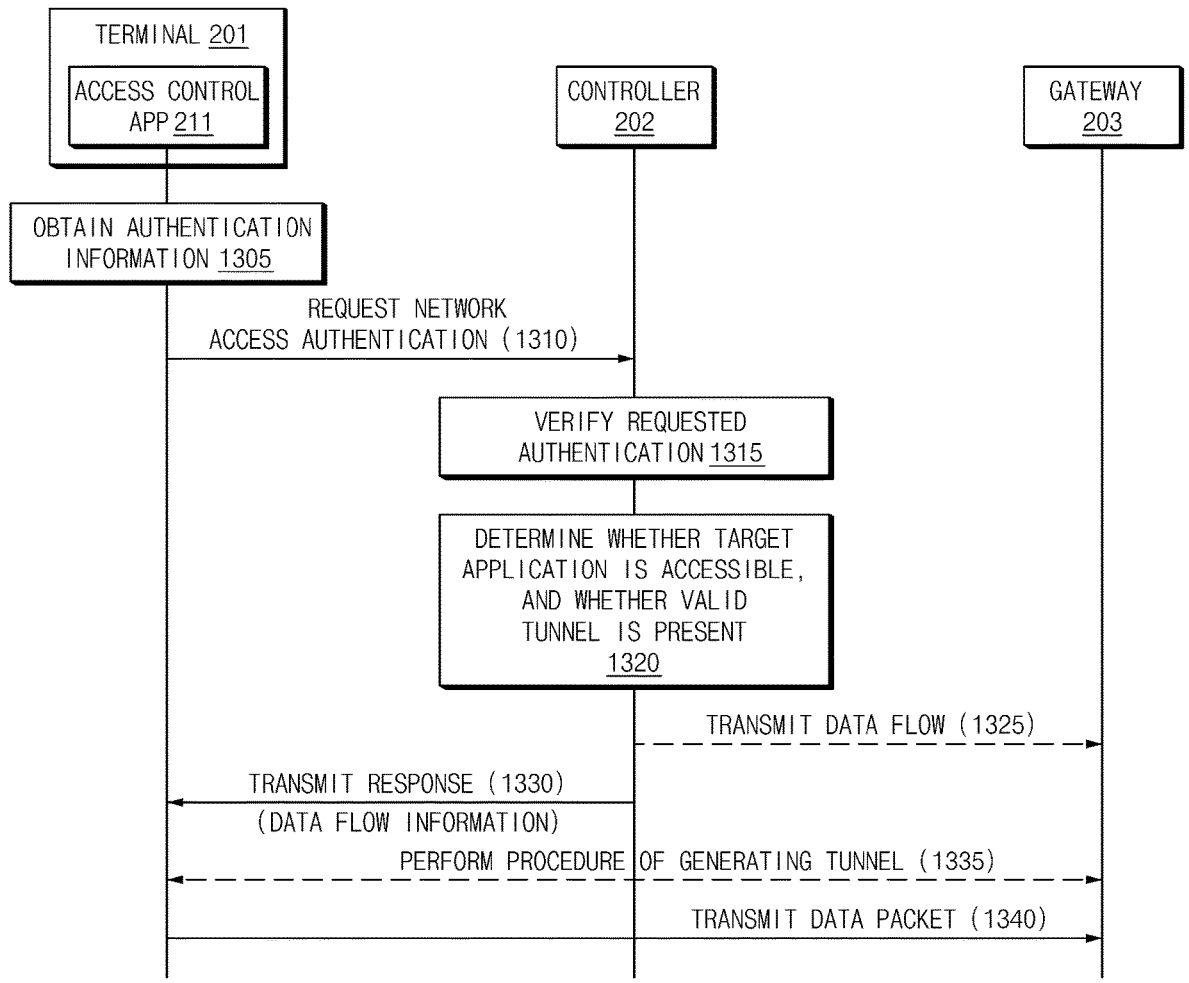
FIG. 13 illustrates a signal flow diagram for authenticating network access, according to various embodiments.

FIG. 13 illustrates a signal flow diagram for authenticating network access, according to various embodiments.

Referring to FIG. 13, in operation 1305, the access control application 211 included in the terminal 201 may obtain enhanced authentication information (e.g., operation 1220 of FIG. 12).

In operation 1310, the access control application 211 may request network access authentication from the controller 202. For example, the access control application 211 may transmit enhanced authentication information to the controller 202. Additionally, the access control application 211 may transmit the IP and/or service port information of a target application and an access target. Additionally, the access control application 211 may transmit control flow identification information allocated to the terminal 201 together with enhanced authentication information.

In operation 1315, the controller 202 may verify the requested authentication. For example, the controller 202 may determine whether the authentication information obtained from the access control application 211 is valid, based on the authentication method matched with information (e.g., the IP and/or service port information of the target application and the access target) identified on a control flow. When authentication information is not valid, in operation 1330, the controller 202 may transmit information indicating that authentication fails, as a response.

When the authentication information is valid, in operation 1320, the controller 202 may determine whether a target application is accessible and/or whether a valid tunnel (or an authorized tunnel) for accessing the destination network is present, from the access control application 211.

For example, the controller 202 may determine whether the target application is accessible, based on whether information (e.g., an ID of the target application, an access target ID, and/or service port information) received from the access control application 211 satisfies an access policy corresponding to information (e.g., information of a terminal, a user, and/or a source network) identified in the control flow. When the access of the target application is impossible, in operation 1330, the controller 202 may transmit, to the terminal 201, a response indicating that access is impossible.

When the access to the target application is possible, the controller 202 may determine whether an authorized tunnel is present between the terminal 201 and the gateway 203. For example, the controller 202 may identify a TEP and/or a tunnel type in a tunnel policy corresponding to a destination network and then may determine whether an authorized tunnel corresponding to the identified TEP is present in a tunnel table. When the authorized tunnel is present, the controller 202 may generate data flow information including information for using a pre-generated tunnel. For example, the data flow information may include a tunnel ID of the pre-generated tunnel, an ID of an application (e.g., an access control application or a target application) authorized to manage access between a terminal, which is TSP, and a gateway, which is TEP, an IP or service port of a destination network, and/or header information to be used for an authenticated data packet. The controller 202 may transmit the generated data flow information to the terminal 201 and the gateway 203 (in operation 1330 and operation 1325).

When an authorized tunnel is not present, the controller 202 may generate data flow information including information (e.g., a tunnel type, a method, authentication information, and/or the IP and port of TEP) and then may transmit the generated information to the gateway 203 and the terminal 201 (in operation 1330 and operation 1325).

As another example, when a tunnel, which satisfies a tunnel policy, from among tunnels to be generated between the terminal 201 and the gateway 203 is not present, in operation 1330, the controller 202 may notify the terminal 201 that network access is impossible.

The access control application 211 may process a result value depending on the response received in operation 1330.

According to an embodiment, when receiving information indicating that network access of the target application is impossible or information indicating that an authorized tunnel is not present, from the controller 202, the access control application 211 may drop the data packet and may output a user interface screen indicating that the network access is impossible.

According to another embodiment, when information required to generate a tunnel is received from the controller 202, the access control application 211 may generate a tunnel to be connected to the gateway 203 in operation 1335 and then may transmit the data packet of the target application through the generated tunnel in operation 1340. When the generation of a tunnel fails despite attempting to generate a tunnel, the access control application 211 may drop a data packet and may display a user interface screen indicating that network access is impossible.

According to another embodiment, when receiving the tunnel ID of the existing tunnel from the controller 202, the access control application 211 may transmit a data packet of the target application to the gateway 203 through a tunnel corresponding to the tunnel ID in operation 1340 without performing an additional tunnel generation procedure.

The access control application 211 and the gateway 203 may add data flow information received from the controller 202 to the data flow table and then may add information about the newly-generated tunnel to a tunnel table.

Figure 14:
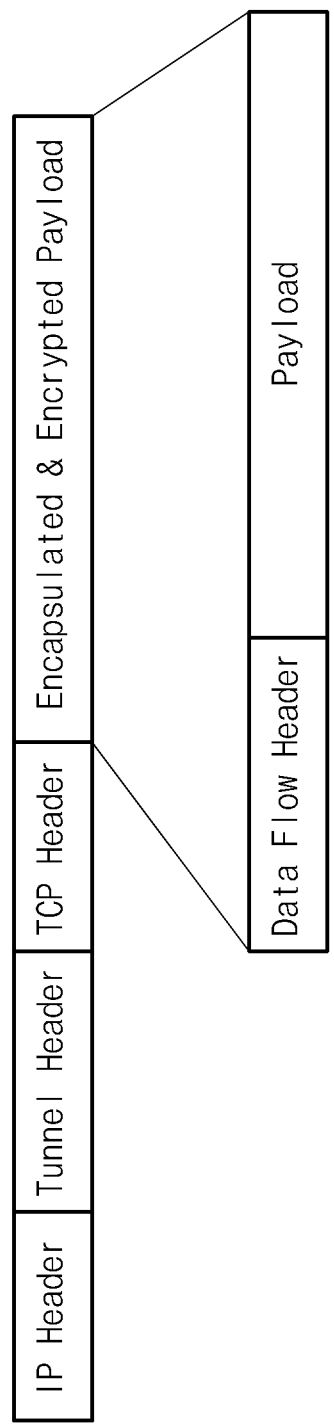
FIG. 14 illustrates a structure of a data packet, according to various embodiments.
Figure 15:
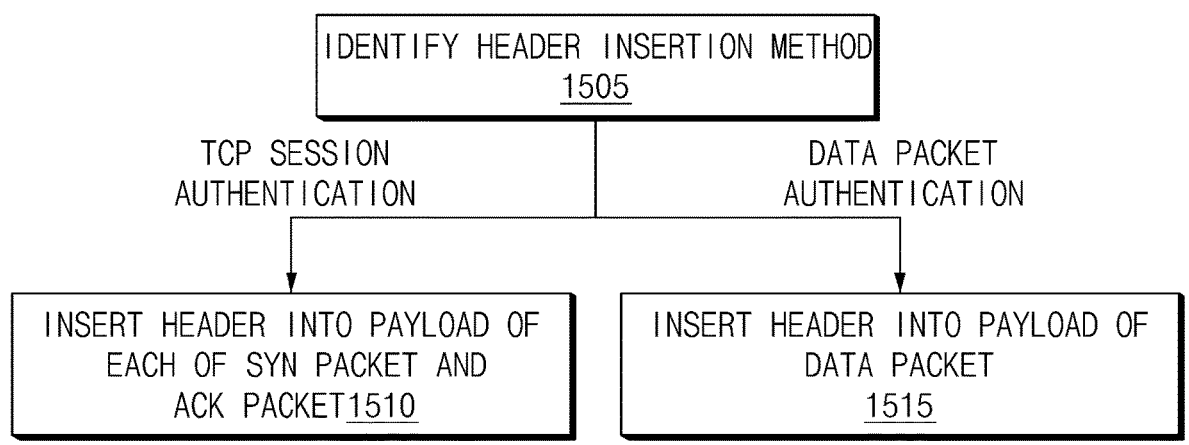
FIG. 15 illustrates a flowchart of an operation for transmitting a data packet in a terminal, according to various embodiments.

FIGS. 14 to 15 describe an operation for transmitting a packet into which header information is inserted, according to various embodiments. FIG. 14 illustrates a structure of a data packet. FIG. 15 illustrates a flowchart of an operation for transmitting a data packet in a terminal.

A terminal (or an access control application) may manipulate a packet based on the authentication request information, which is received from an external server (e.g., a controller) and which is included in the data flow information. For example, the authentication request information may include whether a data flow header (or header information) that is authentication information is inserted and/or an insertion method. For example, referring to FIG. 14, a data packet may include an IP header, a tunnel header, a TCP header, and a payload. The data packet may have a unique tunnel header and location depending on a tunneling algorithm and type. The determination of TCP access and access release may be determined through the TCP header. Whether a data packet is authorized (or valid) may be determined through the data flow header included in the payload. In another embodiment, the data flow header may be inserted at a location (e.g., an IP header) that is advantageous to transmit a data packet. The payload in which the data flow header is inserted may be encapsulated and encrypted.

Referring to FIG. 15, in operation 1505, the terminal may identify a header insertion method (or an authentication information insertion method) depending on a data flow rule. The header insertion method may be one of a header insertion method for TCP session authentication and a header insertion method for data packet authentication. In an embodiment, before a 3-way handshake process for the first TCP access is performed, the current header insertion method may be a header insertion method for TCP session authentication. After the 3-way handshake process is performed and then a connection is established, the current header insertion method may be a header insertion method for a data packet.

When the header insertion method is used for TCP session authentication, in operation 1510, the terminal may insert a header into a payload of each of an SYN packet and an ACK packet. The SYN packet and the ACK packet may be used in the 3-way handshake process for the first TCP access.

When the header insertion method is used for data packet authentication, in operation 1515, the terminal may insert a header into the payload of the data packet. For example, the terminal may insert header information included in the data flow information received from the external server into the data packet. When the data packet is encrypted, the terminal may enable the gateway to determine whether the data packet is valid, by inserting a header into the encrypted data packet.

After performing operation 1510 or operation 1515, the terminal may perform fragmentation depending on a maximum transmission unit (MTU) value. The terminal may transmit the encapsulated and encrypted packet (or data packet) to the destination network.

Figure 16:
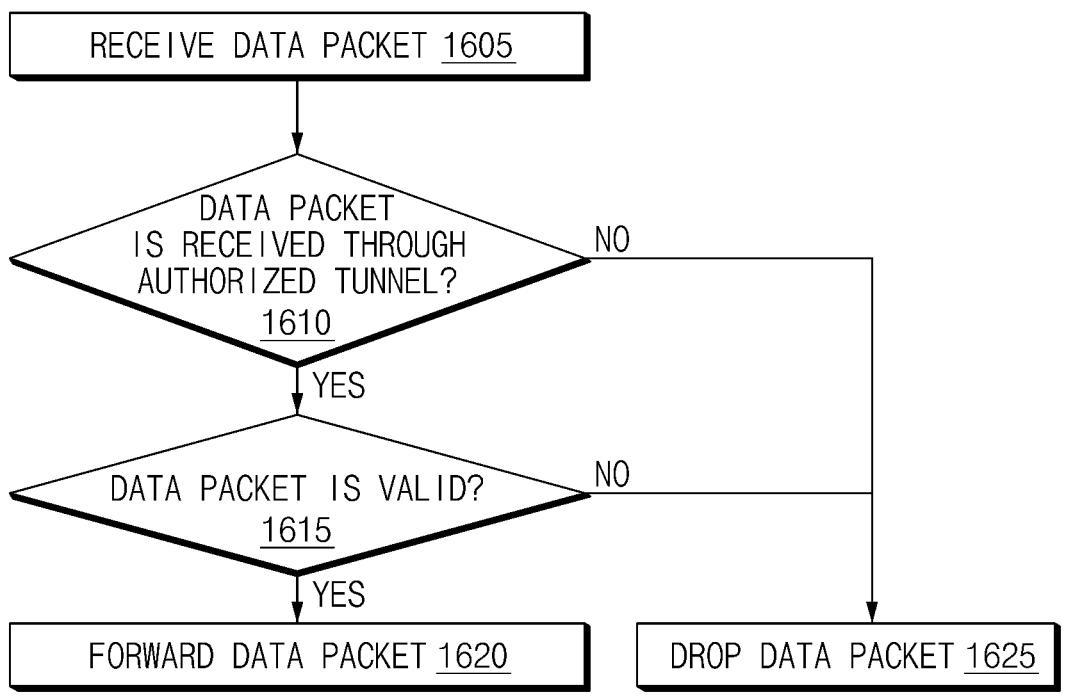
FIG. 16 illustrates a flowchart of an operation for controlling forwarding (or routing) of a data packet in a gateway, according to various embodiments.

FIG. 16 illustrates a flowchart of an operation for controlling forwarding (or routing) of a data packet in a gateway, according to various embodiments.

Referring to FIG. 16, in operation 1605, a gateway may receive a data packet from a terminal.

In operation 1610, the gateway may determine whether the data packet is received through a tunnel authorized by an external server (e.g., a controller). When the data packet is not received through the authorized tunnel, in operation 1625, the gateway may drop the data packet.

When the data packet is received through the authorized tunnel, in operation 1615, the gateway may determine whether the received data packet is valid.

For example, the gateway may determine whether data flow information corresponding to a destination IP and port information, which are included in the received data packet, is present in the data flow table of the gateway. When an access control application of the terminal makes a request for controller access or network access to the controller, the data flow table may be based on the data flow information received by the gateway from the controller.

When the data flow information is present, the gateway may determine whether the identified data flow is an enhanced authentication target. When data flow is not an enhanced authentication target, in operation 1620, the gateway may forward a data packet.

When the identified data flow is the enhanced authentication target, the gateway may identify the authentication method. The authentication check method may be based on source IP, based on a TCP header, or based on a payload header. When the authentication check method is based on the source IP, the gateway may determine whether the data flow information matching the source IP of the data packet is present. When the authentication check method is based on the TCP header, the gateway may determine whether a header is present in the payload of each of the SYN packet and the ACK packet for the 3-way handshaker, and then may determine whether the identified header matches the found data flow information. When the authentication check method is based on the payload header, the gateway may determine whether a header is present in the payload of the data packet, and then may determine whether the identified header matches the found data flow information. When the source IP, the TCP header, or the payload header does not match data flow information, the TCP header is not present, or the payload header is not present, the gateway may determine that the received data packet is invalid. In this case, in operation 1625, the gateway may drop the data packet.

Additionally, the gateway may identify an authentication expiration time of the data flow information. When the authentication expiration time has expired, the gateway may determine that the data packet is invalid.

When the data packet is received through the authorized tunnel and is a valid data packet, in operation 1620, the gateway may forward the received data packet to a destination network.

Figure 17:
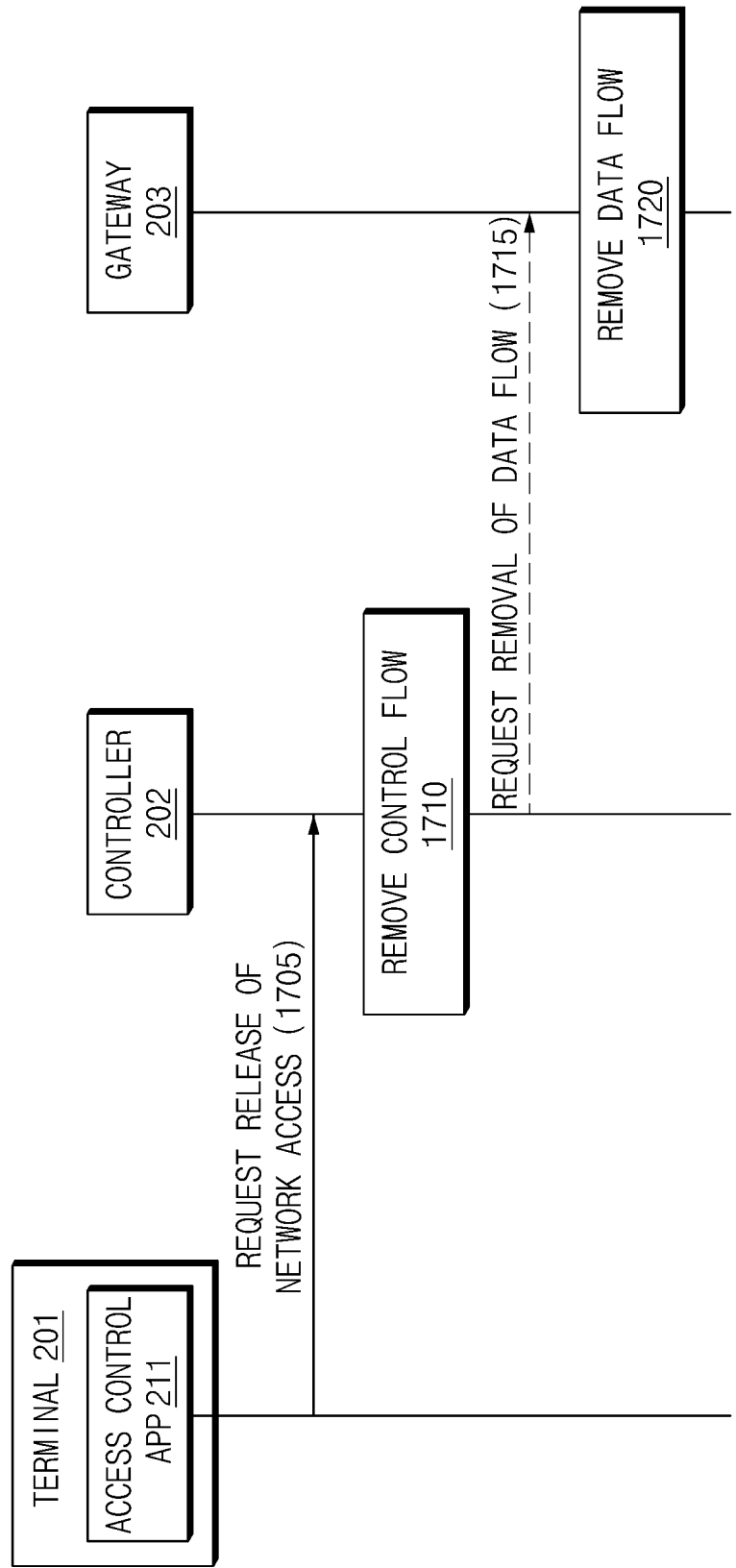
FIG. 17 illustrates a signal flow diagram for releasing network access, according to various embodiments.
Figure 18:
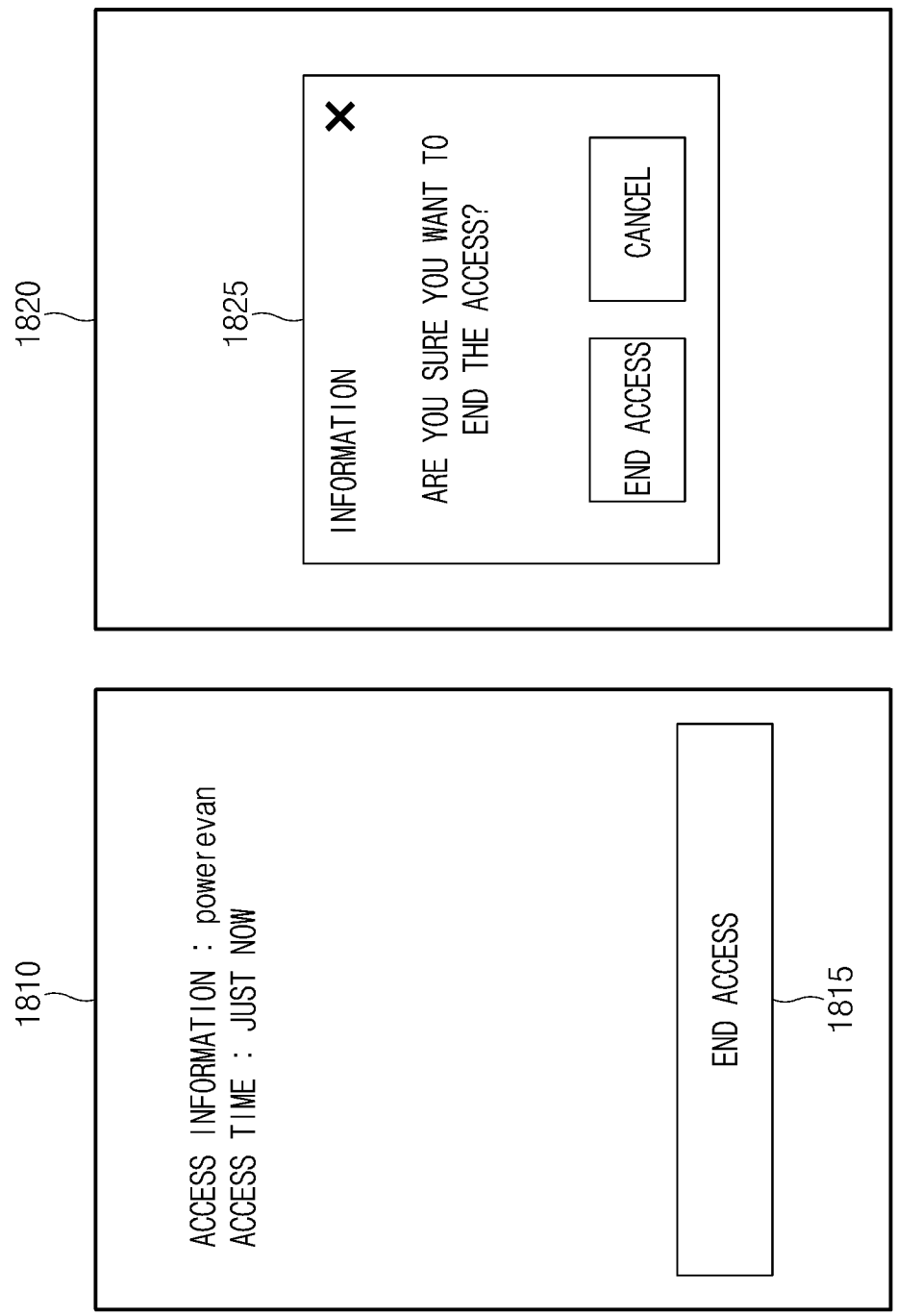
FIG. 18 illustrates a user interface screen for releasing network access, according to various embodiments.

FIGS. 17 to 18 describe an operation for releasing network access, according to various embodiments. FIG. 17 illustrates a signal flow diagram for releasing network access. FIG. 18 illustrates a user interface screen for releasing network access.

Referring to FIG. 17, in operation 1705, the terminal 201 may make a request for releasing network access to the controller 202. For example, the terminal 201 may transmit, to the controller 202, identification information of a control flow between the terminal 201 and the controller 202 together with information requesting the release of the network access.

According to an embodiment, the terminal 201 may attempt to release the network access in response to a network access release event, such as a user's request, the restart of the terminal 201, or a request of the access control application 211. For example, referring to FIG. 18, the terminal 201 may receive a user input for selecting an access end button 1815 from a user interface screen 1810 output through a display. The terminal 201 may identify access termination to the user again by outputting a user interface screen 1820 including a pop-up window 1825. As another example, the terminal 201 may promptly perform operation 1705 without outputting the user interface screen 1520.

In operation 1710, the controller 202 may remove (or release) a control flow corresponding to the received identification information in response to a request of the terminal 201. When the control flow is removed, all tunnels and data flows that are dependent on the control flow may be removed.

In operation 1715, the controller 202 may request the gateway 203 to remove a tunnel and a data flow, which are dependent on the removed control flow. In this case, the controller 202 may transmit tunnel information and data flow information that are to be removed.

In operation 1720, the gateway 203 may remove the tunnel and data flow in response to the request of the controller 202. When the tunnel and data flow are removed, the terminal may no longer transmit data packets to a destination network.

The invention claimed is:

1. A terminal comprising:
a communication circuit;
a processor operatively connected to the communication circuit; and
a memory operatively connected to the processor and configured to store a target application and an access control application, wherein the memory stores instructions that cause, when executed by the processor, the terminal to:
  detect a network access event for a destination network of the target application through the access control application;
  determine whether data flow information corresponding to identification information of the target application and the destination network is present and generated from an external server, through the access control application;
  perform authentication of a data flow based on authentication information included in the data flow information, through the access control application;
  request the external server to confirm whether the authentication of the data flow is valid;
  receive information from the external server to create a tunnel between the terminal and a gateway, and create a tunnel based on the information;
  transmit a data packet using the tunnel, when the authentication of the data flow is confirmed to be valid and the tunnel exists between the terminal and the gateway, or drop the data packet when the data flow information is not present or the authentication of the data flow is not valid.

2. The terminal of claim 1, wherein the instructions cause the terminal to:
  make a request for network access for the destination network to the external server by using the communication circuit when the data flow information is not present or the authentication of the data flow is not valid;
  receive a first response to the request for the network access from the external server; obtain enhanced authentication information from a user through the access control application based on an authentication method indicated by the first response;
  transmit the enhanced authentication information to the external server by using the communication circuit;
  receive a second response indicating that the enhanced authentication information is valid, from the external server; and
  transmit the data packet of the target application based on the second response.

3. The terminal of claim 1, wherein the instructions cause the terminal to:
  determine whether the tunnel, which corresponds to the identification information of the target application and the destination network and which is authorized from the external server, is present, through the access control application when the data flow information is present and the authentication of the data flow is valid; and
  transmit the data packet of the target application when the authorized tunnel is present, or drop the data packet of the target application when the authorized tunnel is not present.

4. The terminal of claim 3, wherein the instructions cause the terminal to:
  make a request for network access for the destination network to the external server by using the communication circuit when the authorized tunnel is not present;
  receive a third response to the request for the network access from the external server; determine whether an available tunnel is present, based on the third response;
  transmit the data packet of the target application by using the communication circuit through the available tunnel when the available tunnel is present, or drop the data packet of the target application when the available tunnel is not present.

5. The terminal of claim 1, further comprising:
a display operatively connected to the processor;
wherein the instructions cause the terminal to:
  detect a controller access event for the external server through the access control application;
  make a request for controller access to the external server by using the communication circuit in response to the detected controller access event;
  receive a fourth response to the request for the controller access from the external server; and
  output a user interface screen indicating that access to the external server is completed, or indicating that the access to the external server is blocked, through the display based on the fourth response.

6. The terminal of claim 1, further comprising:
a display operatively connected to the processor;

wherein the instructions cause the terminal to:
receive a first user input for requesting user authentication through the access control application; and
make a request for user authentication for a user of the terminal to the external server by using the communication circuit wherein the request for the user authentication includes information corresponding to the first user input;
receive a fifth response to the request for the user authentication from the external server; and
output a user interface screen indicating that the user authentication is completed, or indicating that the user authentication fails, through the display based on the fifth response.

7. The terminal of claim 1, wherein the instructions cause the terminal to:
receive a second user input for requesting release of network access; and
make a request for network access release to the external server through the communication circuit in response to the second user input.

8. The terminal of claim 1, wherein the instructions cause the terminal to:
identify a header inserting method of a packet to be transmitted;
insert a header into a payload of each of an SYN packet and an ACK packet when the header inserting method is used for TCP session authentication; and
insert a header of the data flow into a payload of a data packet when the header inserting method is used for authentication of the data packet.

9. The terminal of claim 1, wherein the authentication information includes information for performing an authentication request including authentication method or authentication target.

* * * * *